(12) United States Patent
Yoshida et al.

(10) Patent No.: US 7,310,705 B2
(45) Date of Patent: Dec. 18, 2007

(54) MULTITHREAD PROCESSOR AND THREAD SWITCHING CONTROL METHOD

(75) Inventors: Toshio Yoshida, Kawasaki (JP); Masaki Ukai, Kawasaki (JP); Naohiro Kiyota, Kawasaki (JP)

(73) Assignee: FUJITSU Limited, Kawasaki (JP)

( * ) Notice: Subject to any disclaimer, the term of this patent is extended or adjusted under 35 U.S.C. 154(b) by 297 days.

(21) Appl. No.: 10/981,772

(22) Filed: Nov. 5, 2004

(65) Prior Publication Data

US 2006/0026594 A1 Feb. 2, 2006

(30) Foreign Application Priority Data

Jul. 29, 2004 (JP) .............................. 2004-222042

(51) Int. Cl.
  G06F 12/08 (2006.01)
  G06F 12/12 (2006.01)
  G06F 12/10 (2006.01)
(52) U.S. Cl. .................. 711/122; 711/133; 711/137
(58) Field of Classification Search ................ None
  See application file for complete search history.

(56) References Cited

U.S. PATENT DOCUMENTS

| | | | | |
|---|---|---|---|---|
| 5,872,985 A | 2/1999 | Kimura | ................. | 395/800.01 |
| 6,049,867 A | 4/2000 | Eickemeyer et al. | ........ | 712/228 |
| 6,269,425 B1 * | 7/2001 | Mounes-Toussi et al. | ... | 711/133 |
| 6,470,443 B1 | 10/2002 | Emer et al. | ................. | 712/205 |
| 6,571,318 B1 * | 5/2003 | Sander et al. | ............... | 711/137 |
| 2003/0191927 A1 | 10/2003 | Joy et al. | .................... | 712/228 |
| 2005/0138333 A1 * | 6/2005 | Samra | ........................ | 712/218 |

FOREIGN PATENT DOCUMENTS

| | | |
|---|---|---|
| JP | 8-147165 | 6/1996 |
| JP | 2002-163121 | 6/2002 |
| JP | 2002-342163 | 11/2002 |

OTHER PUBLICATIONS

Eickemeyer et al., "Evaluation of Multithreaded Uniprocessors for Commerical Application Environments," Computer Architecture News, Association for Computer Machinery, New York, vol. 24, No. 2, May 1, 1996, pp. 203-212.

* cited by examiner

*Primary Examiner*—Hyung Sough
*Assistant Examiner*—Duc T. Doan
(74) *Attorney, Agent, or Firm*—Staas & Halsey LLP

(57) ABSTRACT

The present invention relates to a multithread processor. In the multithread processor, when a cache miss occurs on a request related to an instruction in, of a plurality of caches arranged hierarchically, a cache at the lowest place in the hierarchy, with respect to the request suffering the cache miss, a cache control unit notifies an instruction identifier and a thread identifier, which are related to the instruction, to a multithread control unit. When a cache miss occurs on an instruction to be next completed, the multithread control unit makes the switching between threads on the basis of the instruction identifier and thread identifier notified from the cache control unit. This enables effective thread switching, thus enhancing the processing speed.

31 Claims, 29 Drawing Sheets

·PROCESSING FOR SINGLE-THREAD IN CPU    ONE PROGRAM A IS PROCESSED BY ONE CPU.

·PROCESSING FOR MULTITHREAD (TWO THREADS) IN CPU    TWO PROGRAMS A AND B ARE PROCESSED BY ONE CPU.

FIG. 26

·SMT (SIMULTANEOUS MULTITHREADING)

| A | A | A | A | A | A |
|---|---|---|---|---|---|
| A | B | A | A | B | A |
| B | B | A | B | B | B |
| A | A | B | B | A | A |
| A | A | A | B | A | B |

PROCESSOR INSTRUCTION-PROCESSED IN IN-ORDER MODE
CACHE MISS OCCURRENCE SEQUENCE IS INSTRUCTION SEQUENCE

PROCESSOR INSTRUCTION-PROCESSED IN OUT-OF-ORDER MODE
CACHE MISS OCCURRENCE SEQUENCE DOES NOT ALWAYS AGREE WITH INSTRUCTION SEQUENCE

MULTITHREAD PROCESSOR AND THREAD SWITCHING CONTROL METHOD

BACKGROUND OF THE INVENTION (1) Field of the Invention

The present invention relates to thread switching control in a multithread processor.

(2) Description of the Related Art

In the recent years, as the representatives of computer architectures, in addition to a CISC (Complex Instruction Set Computer) architecture designed to carry out complex processing in accordance with one instruction, there have been known an RISC (Reduced Instruction Set Computer) architecture made to simplify processing to be implemented relative to one instruction, a VLIW (Very Long Instruction Word) made to collect a plurality of simultaneously processible instructions into one long instruction through software, and other architectures.

In addition, the processing methods in a central processing unit (CPU) of a computer for realizing these architectures are roughly classified into two: in-order execution type and out-of-order execution type.

FIG. 23 is an illustration for explaining an in-order execution type processing method, while FIG. 24 is an illustration for explaining an out-of-order execution type processing method. As shown in FIG. 23, the in-order execution type is a method of conducting instruction processing according to a program, and as shown in FIG. 24, the out-of-order execution type is a method of seeing the dependence (dependent relationship) between instructions so that, in the case of an instruction having no dependence, the processing is conducted without following the program sequence.

Furthermore, in the recent years, in addition to single thread processing for carrying out one program (thread) in one processor, attention has been paid to a multithread processor system designed to physically carry out a plurality of threads in parallel in one processor.

FIGS. 25A and 25B are illustrations for explaining a multithread processor system. FIG. 25A is an illustration for explaining single thread processing, while FIG. 25B is an illustration for explaining multithread processing. FIG. 25B shows an example of multithread processing in which two programs A and B are processed in parallel in one CPU.

In general, in addition to a register visible to software and a status register (CPU status register), a CPU has resources for carrying out the addition, subtraction, multiplication, division, load processing for reading out memory data into a register and software processing for writing register data in a memory. The multithread processor is designed to multiplex registers visible to software in one CPU so that a plurality of programs share an instruction execution resource for addition/subtraction or the like while implementing separate programs.

As a method of realizing the above-mentioned multithread processing, in addition to a fine grained multithreading method or simultaneous multithreading (SMT) method (see FIG. 26) which carries out a plurality of threads simultaneously, there has been known a coarse grained multithreading method or vertical multithreading (VMT) method (see FIG. 27) which is designed to make the switching to a different thread and implement it in the case of the occurrence of an event such as a cache miss without carrying out a plurality of threads simultaneously (for example, see Japanese Patent Laid-Open No. 2002-163121).

FIG. 26 is an illustration for explaining the SMT method, while FIG. 27 is an illustration for explaining the VMT method.

The VMT method is for covering up the cache-miss instruction processing which requires a long time, and it is designed to, in the case of the detection of cache miss, make the switching to a different thread and carry out the thread in an execution unit or control unit (both are not shown) with respect to the processing other than a memory access while a cache control unit (not shown) conducts the processing to bring data from a memory to a cache. Moreover, in this VMT method, with respect to threads in which cache miss is hard to develop, the switching to a different thread is made when a given period of time elapses.

FIG. 28 is an illustration for explaining the processing at the occurrence of a cache miss in the in-order mode, and FIG. 29 is an illustration for explaining the processing at the occurrence of a cache miss in the out-of-order mode, and FIG. 30 is an illustration for explaining a conventional thread switching method in the out-of-order mode.

So far, the VMT method has been used on only the aforesaid in-order processor. In a processor made to conduct the in-order execution, an event of a cache miss occurs in a program sequence, and the response of cache miss data from a memory is made in the program sequence (see FIG. 28). On the other hand, in a processor made to conduct execution in the out-of-order mode, the memory access does not arise in an instruction sequence in a program, and as shown in FIG. 29, the cache miss event does not always occur in the program sequence.

For example, as shown in FIG. 30, in a case in which two instructions A and B in which a cache miss occurs exist on a thread X and the sequence on the thread X is the order of the instruction A and the instruction B, when the execution of the instruction B can be conducted prior to the instruction A, a cache miss of the instruction B is detected prior to the detection of a cache miss of the instruction A. For example, in the example shown in FIG. 30, if the cache miss of the instruction B is detected and the switching is made from the thread X to another thread Y before the occurrence of the cache miss of the instruction A, the cache miss of the instruction A occurs after the resumption of the execution of the thread X.

Incidentally, in the case of the in-order execution type processor, since the execution of the instruction B starts after the start of the execution of the instruction A, the cache miss occurs in the order of the instruction A and the instruction B.

There is a problem which arises with the conventional VMT type multithread processing, however, in that, since the thread switching is made whenever a cache miss occurs, the frequency of the thread switching increases, which leads to inefficient processing. Thus, there is a need to achieve the thread switching efficiently for increasing the processing speed.

SUMMARY OF THE INVENTION

The present invention has been developed in consideration of these problems, and it is therefore an object of the invention to achieve the thread switching efficiently for enhancing the processing speed.

For this purpose, in accordance with an aspect of the present invention, there is provided a multithread processor capable of carrying out a plurality of threads, each having one or more instructions, in parallel through the use of one or more arithmetic units, comprising a multithread control unit for selectively switching the thread to be executed by the arithmetic unit and for setting a thread identifier indicative of one of the plurality of threads to which the instruction pertains, an instruction control unit for setting an instruction identifier which specifies the instruction in the thread, a plurality of caches arranged hierarchically and each made to retain data temporarily, and a cache control unit for managing the writing/readout of the data in/from the plurality of caches, wherein, in a case in which a cache miss occurs on a request related to the instruction in, of the plurality of caches, the cache which is at the lowest place in the hierarchy, with respect to the request related to the cache miss, the cache control unit notifies the instruction identifier and the thread identifier, related to this instruction, to the multithread control unit, and the multithread control unit makes the switching of the thread, which is in execution in the arithmetic unit, to a different thread on the basis of the instruction identifier and the thread identifier notified from the cache control unit.

In this case, it is also appropriate that, when a request related to the cache miss is issued from the cache of the plurality of caches, which is at a higher place in the hierarchy and in which the cache miss occurs, to the cache which is at a lower place in the hierarchy, the cache control unit secures a storage area for storing data response from the cache, which is at the lower place in the hierarchy, with respect to the request and sets a cache request identifier for specifying this storage area and, in a case in which the instruction is an instruction in the thread and is a demand request which leads to the interchange of the data between a register for storing the data so that the arithmetic unit carries out the arithmetic operations and an external storage unit in the exterior of the multithread processor, notifies the thread identifier, the cache request identifier and the instruction identifier, related to the instruction, to the multithread control unit.

In addition, it is also appropriate that, in a case in which the instruction is a prefetch request for putting the data, acquired from the external storage unit in advance, in the register, the cache control unit does not notify the thread identifier, the cache request identifier and the instruction identifier, related to the instruction, to the multithread control unit.

Still additionally, it is also appropriate that the cache control unit monitors the elapsed time after the prefetch request is issued to the external storage unit and, in a case in which the data to be accessed according to the instruction agrees with the data acquired from the external storage unit according to the preceding prefetch request and the elapsed time exceeds a predetermined period of time, the cache control unit does not notify the thread identifier, the cache request identifier and the instruction identifier, related to the instruction, to the multithread control unit.

Yet additionally, it is also appropriate that a fetch sequence managing unit is provided which manages a scheduled instruction completion sequence of the instruction about the fetch, and in a case in which, as the scheduled instruction completion sequence in the fetch sequence managing unit, a cache line allocated on the cache, which is at the higher place in the hierarchy, with respect to the leading demand request is identical to a cache line following the demand request in the order on the thread and allocated on the cache, which is the higher place in the hierarchy, with respect to the instruction for which the storage area is secured and on which the cache miss occurs prior to the demand request, the cache control unit notifies the thread identifier and the instruction identifier, related to the demand request, together with the cache request identifier related to the instruction to the multithread control unit.

Moreover, it is also appropriate that a cache miss information storing unit is provided which is made such that at least information indicative of the occurrence of a cache miss, the cache request identifier related to the cache miss, and the thread identifier and the instruction identifier, related to the request, are registered in a state associated to each other, and the multithread control unit acquires the information on the cache miss on the basis of the information stored in the cache miss information storing unit.

Still moreover, it is also appropriate that information for specifying a move-in buffer made to temporarily store response data to a request issued to the cache, which is at the lower place in the hierarchy, or the external storage unit in conjunction with the occurrence of the cache miss is used as the cache request identifier.

Yet moreover, it is also appropriate that, after at least the information indicative of the occurrence of the cache miss, the cache request identifier, the thread identifier and the instruction identifier, related to the instruction, are stored in the cache miss information storing unit, when the data response to the instruction is made from the external storage unit, the cache control unit notifies the information indicative of the data response and the cache request identifier related to the data response to the multithread control unit and resets the corresponding information indicative of the occurrence of the cache miss in the cache miss information storing unit.

Furthermore, it is also appropriate that the cache miss information storing unit is made such that at least the information indicative of the occurrence of the cache miss, the thread identifier and the instruction identifier, related to the request, are registered in a state associated with each other and is made as a cache miss information buffer provided for each move-in buffer.

Still furthermore, it is also appropriate that the information indicative of the occurrence of the cache miss is registered in the cache miss information storing unit and, in a case in which the instruction identifier and the thread identifier, related to the cache request, agree with the instruction identifier related to the leading instruction in the scheduled instruction completion sequence managed in the fetch sequence managing unit and the thread identifier, the multithread control unit switches the thread.

Yet furthermore, it is also appropriate that, in a case in which the cache miss occurs when the instruction which is in execution but which does not reach completion is canceled, the multithread control unit resets the information indicative of the occurrence of the cache miss with respect to the corresponding cache request in the cache miss information storing unit.

In addition, it is also appropriate that the cache miss information storing unit stores information indicative of a factor contributing to the fact that the thread transits to a halt state with respect to the request which suffers the cache miss which leads to the switching of the thread.

Still additionally, it can also reset the information indicative of the factor contributing to the fact that the thread transits to the halt state in the cache miss information storing unit when the thread is switched and returned.

Yet additionally, it is also appropriate that, when the data response related to the cache miss takes place, the cache control unit notifies a signal indicative of the data response and the cache request identifier to the multithread control unit so that the multithread control unit switches and returns the thread when the information indicative of the factor contributing to the fact that the thread transits to the halt state is stored in the cache miss information storing unit.

Moreover, it is also appropriate that the cache miss information storing unit stores the information indicative of the factor contributing to the fact that the thread transits to the halt state with respect to the request suffering the cache miss which leads to the thread switching and, at the data response related to the cache miss, the cache control unit notifies a signal indicative of the data response and the cache request identifier to the multithread control unit, and when the information indicative of the factor contributing to the transition of the thread to the halt state is stored in the cache miss information storing unit, the multithread control unit switches and returns the thread.

Still moreover, it is also appropriate that, in a case in which the instruction is a store instruction and a cache miss occurs on the address of an object of the store, the instruction control unit carries out the detachment control to handle the store instruction as the store instruction reaches completion, without waiting for the data response related to the store object address, and the cache control unit does not make notification on the cache miss of the store instruction to the multithread control unit.

Yet moreover, it is also appropriate that, also in a case in which the cache miss occurs on the instruction in canceling the instruction which is in execution and which does not reach completion, the cache control unit does not notify the fact of the occurrence of the cache miss, the cache request identifier, the thread identifier and the instruction identifier to the multithread control unit.

Furthermore, the cache control unit can also be provided for each of the plurality of caches.

In addition, in accordance with a further aspect of the present invention, there is provided a thread switching control method for use in a multithread processor made to carry out a plurality of threads in parallel through the use of one or more arithmetic units, comprising a thread identifier setting step of setting a thread identifier indicative of a thread of the plurality of threads to which an instruction pertains, an instruction identifier setting step of setting an instruction identifier for specifying the instruction in the thread, a cache control step of managing the writing/readout of the data in/from the plurality of caches arranged hierarchically and made to retain data temporarily, and a switching step of, in a case in which a cache miss occurs on a request related to the instruction in, of the plurality of caches, the cache which is at the lowest place in the hierarchy, making the switching from the thread, which is in execution in the arithmetic unit, to a different thread on the basis of the instruction identifier and the thread identifier, related to the request, with respect to the request related to the cache miss.

According to the present invention, the switching among a plurality of threads can be made with high efficiency, thus shortening the processing time and effectively covering up the processing time for the data response to an external storage unit due to the thread switching.

BRIEF DESCRIPTION OF THE DRAWINGS

FIG. 26 is an illustration for explaining an SMT method;

DESCRIPTION OF THE PREFERRED EMBODIMENTS

An embodiment of the present invention will be described hereinbelow with reference to the drawings.

Figure 1:
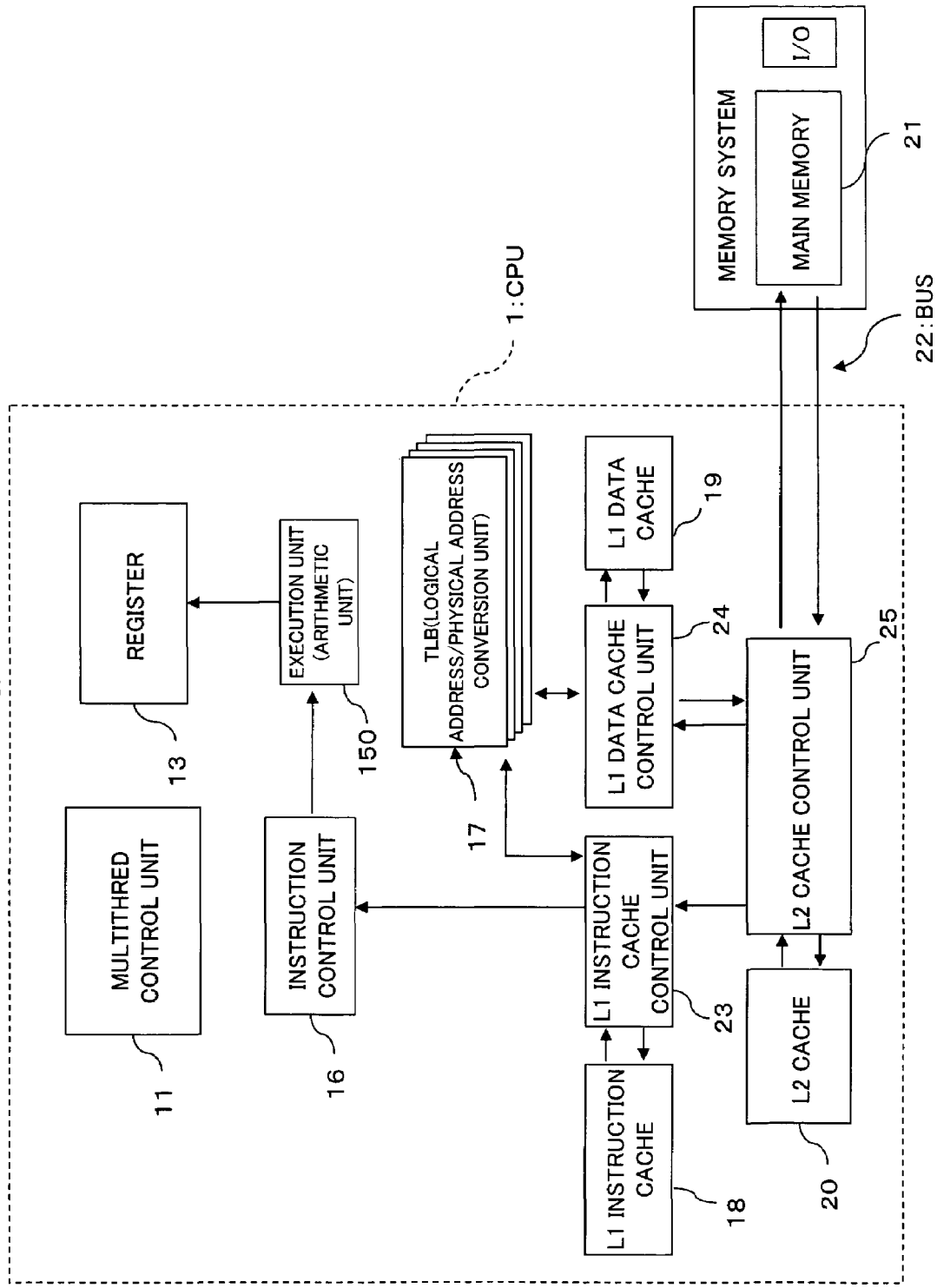
FIG. 1 is a block diagram showing a configuration of a multithread processor according to an embodiment of the present invention.

FIG. 1 is a block diagram showing a configuration of a multithread processor according to an embodiment of the present invention.

Figure 2:
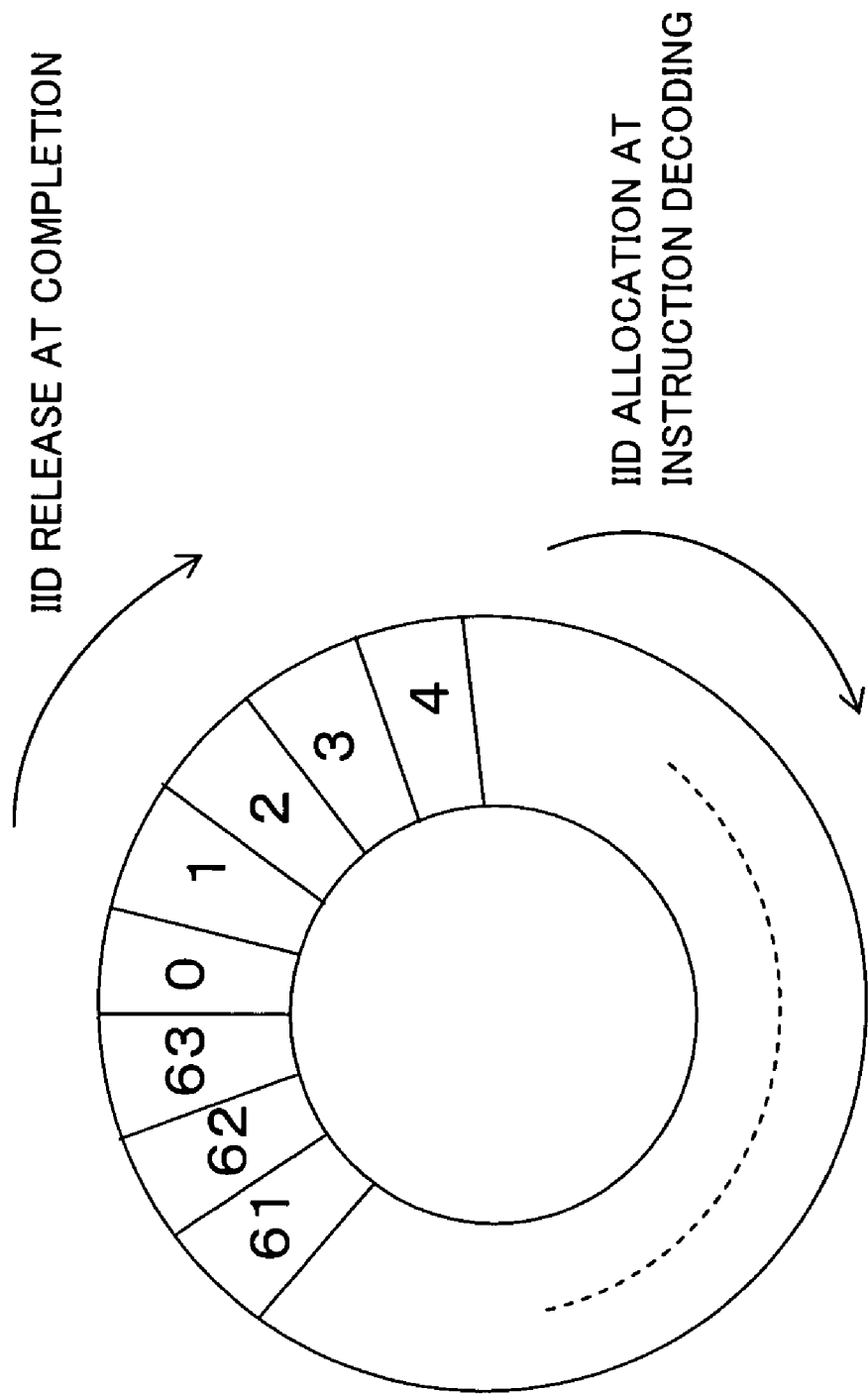
FIG. 2 is an illustration useful for explaining an IID setting method in the multithread processor according to the embodiment of the present invention.

A CPU (Central Processing Unit) 1 serving as a multithread processor according to the embodiment of the present invention is designed, for example, as a multithread processor capable of carrying out a plurality of threads (programs) in parallel through the use of one or more arithmetic units 15 (see FIG. 2).

As FIG. 1 shows, this CPU 1 is made up of a multithread control unit 11, a register 13, an execution unit 150, an instruction control unit 16, a TLB (logical address/physical address conversion unit) 17, an L1 instruction cache 18, an L1 data cache 19, an L2 cache 20, an L1 instruction cache control unit 23, an L1 data cache control unit (cache control unit) 24 and an L2 cache control unit (cache control unit) 25, with it being connected through a bus 22 to a main memory 21 to be communicable.

The instruction control unit 16 is made to acquire an instruction from the primary instruction cache 18, the L2 cache 20 or the main memory 21 and to carry out the control for executing it in the execution unit 150, and is made to set (allocate) an instruction identifier (IID) for specifying each instruction in a thread.

FIG. 2 is an illustration useful for explaining an IID setting method in the multithread processor (CPU 1) according to the embodiment of the present invention. As shown in FIG. 2, in this CPU 1, 64 (0 to 63) IIDs are prepared in advance, and IID numbers 0, 1, 2, 3, . . . are allocated (set) to the respective instructions in the ascending sequence (order) at the instruction decoding and, after the allocation up to 63, it is returned to 0 and the allocation is again made in the ascending sequence.

Likewise, the completion (commit) is made in the ascending sequence from 0. For example, in a case in which the execution of the instruction corresponding to the IID 10 does not come to an end yet, even if the execution of the instruction corresponding to IID number 11 comes to an end, the completion processing is not conducted on this IID number 11, and this result is written in the register 13 or the memory 21 to be left therein.

In response to the completion of the instruction, the IID set with respect to this instruction is released and allocated to a different instruction. This enables identifying the decoding, execution and completion of the instruction. Moreover, when the thread executed on the processor is switched and the instruction is canceled, or when a branch prediction miss or trap occurs, that IID is invalidated, and the allocation to the instruction string to be decoded next is made from 0.

The L1 data cache control unit 24 is equipped with fetch queues 28 (fetch sequence managing unit; see FIG. 4) for managing a scheduled instruction completion sequence for a request on fetch. This fetch queues 28 are realized by a plurality of (for example, 16) data storage areas and successively secured according to a program sequence with respect to instructions having access to a cache (L1 instruction cache 18, L1 data cache 19, L2 cache 20) at the instruction decoding.

In addition, the instruction control unit 16 is made to carry out the detachment control to handle a store instruction as the store instruction reaches completion, without waiting for the data response related to the store object address (the details will be mentioned later).

The TLB (Translation Look-aside Buffer; logical address/physical address conversion unit) 17 is a kind of cache provided for reducing the penalty for the page table reference occurring at the conversion from a logical address to a physical table and is made to preserve the histories of the referred-to addresses and the conversion information for realizing the speed-up of the address conversion.

The execution unit (arithmetic unit) 150 is designed to conduct various types of processing (instruction processing) through the use of register windows 12 or the like and, for example, functions as an arithmetic unit (execution arithmetic unit) to carry out various types of arithmetic operations.

The main memory 21 is a memory located in the exterior of the CPU 1 for storing various types instructions and data and is connected through a bus 22 to the CPU 1 to be communicable. In a case in which instructions and data needed for the processing/execution in the execution unit 150 do not exist in the L1 instruction cache 18, the L1 data cache 19 and the L2 cache 20 (at a cache miss), the CPU 1 reads out the instructions and data from the main memory 21 through the bus 22 or the like.

The L1 instruction cache 18 is a primary cache for storing instructions to be executed in the execution unit 150, and the L1 data cache 19 is a primary cache for storing various types of data used when the execution unit 150 executes instructions. The L2 cache 20 is a secondary cache for storing various types of instructions and data. That is, in this CPU 1, a plurality of caches (L1 instruction cache 18, L1 data cache 19, L2 cache 20) are provided in a hierarchical fashion.

Furthermore, in this embodiment, of the plurality of caches provided in the CPU 1, the L2 cache 20 located at the position closest to the main memory 21 located in the exterior of the CPU 1 is a cache which is at the lowest place in the hierarchy and, with respect to the L2 cache 20, the L1 instruction cache 18 and the L1 data cache 19 are caches (higher side caches) which are at a higher place in the hierarchy.

A thread switching method in this CPU 1 will be described hereinbelow focusing on a cache miss in the L1 data cache 19 and the L2 cache 20.

In the following description, the L1 data cache 19 will sometimes be referred to simply as an L1 cache, and the L1 data cache control unit 24 will sometimes be referred to simply as an L1 cache control unit.

The L1 data cache control unit (cache control unit) 24 is provided in corresponding relation to the L1 data cache 19 and is made to manage/control the writing/readout of data in/from the L1 data cache 19. Moreover, the L1 instruction cache control unit 23 is provided in corresponding relation to the L1 instruction cache 18 and is made to manage/control the writing/readout of data (instruction data) in/from the L1 instruction cache 18. The L1 cache control unit (cache control unit) 25 is provided in corresponding relation to the L2 cache 20 and is made to manage/control the writing/readout of data (instruction data, data) in/from the L2 cache 20.

In addition, the L1 data cache control unit 24 is equipped with a plurality of buffers (L1MIB; L1 Move-In Buffer) 26 for temporarily storing response data to a request issued to the L2 cache 20 (L2 cache control unit 25) (see FIG. 4 and others) and, likewise, the L2 cache control unit 25 is equipped with a plurality of buffers (L2MIB; L2 Move-in Buffer) 27 for temporarily storing response data to a request issued to the main memory 21 due to the occurrence of an L2 cache miss (see FIG. 4 and others).

The L2 cache control unit 25 is made to, when a cache miss occurs in the L2 cache 20, secure a buffer (L2MIB; L2 Move-In Buffer) for temporarily storing response data to a request issued to the main memory 21 and then issue a request to the main memory 21.

A detailed description about these MIBs will be given later.

Figure 3:
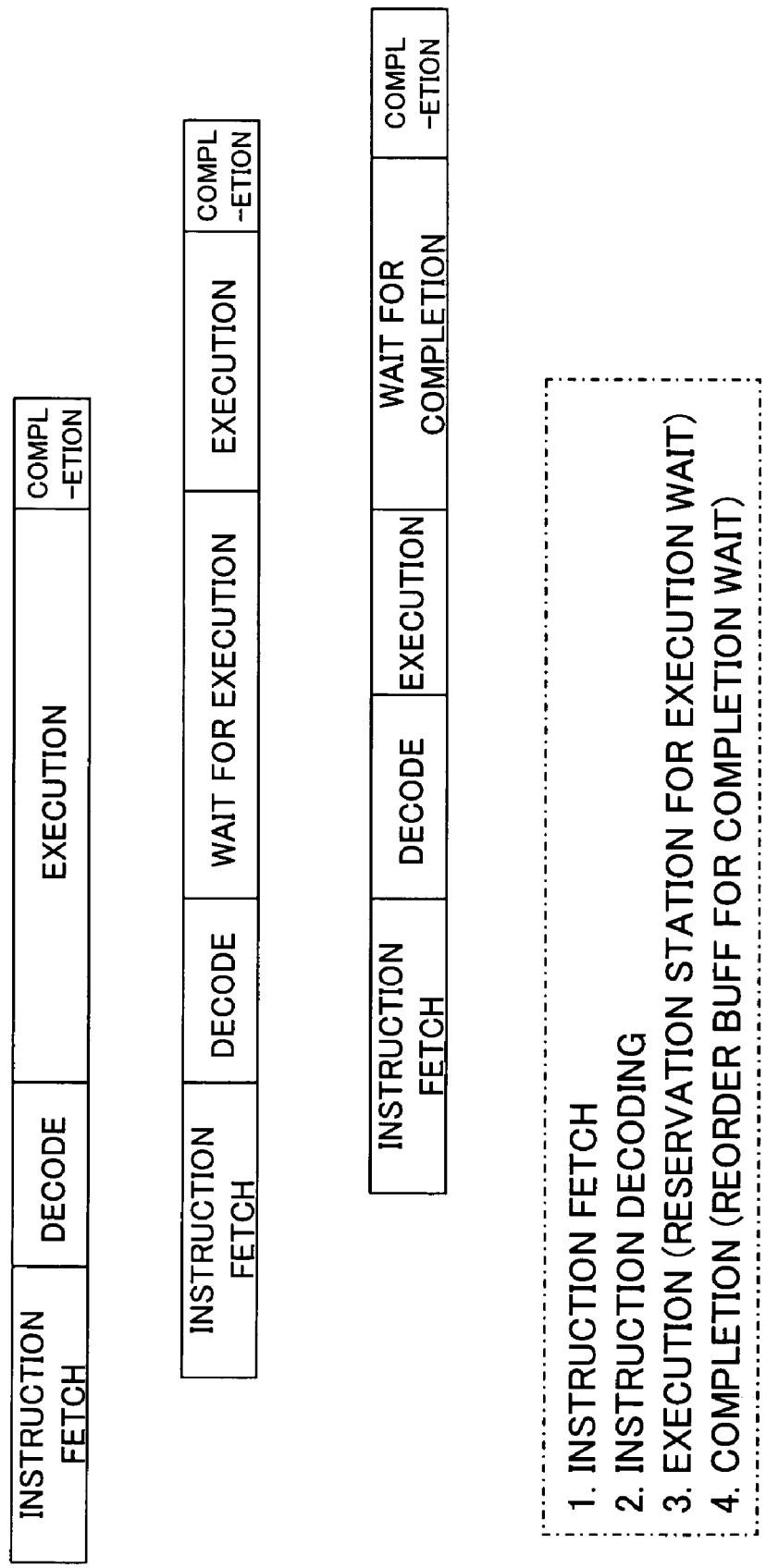
FIG. 3 is an illustrative view showing a pipeline in the out-of-order mode.

FIG. 3 is an illustrative view showing a pipeline in the out-of-order mode. The description on the out-of-order control will be given in a state divided into four stages: instruction fetch, instruction decoding, execution and completion.

First, an instruction code is fetched from an instruction cache according to a program sequence. Secondly, the acquired instruction code is decoded in the decoding stage to see the execution contents of the instruction. Moreover, a detection is made as to whether or not there is a dependence between the input data on its own instruction and the result data on the previous instruction.

After the decoding of the instruction code, the control advances to the execution stage for carrying out the arithmetic operations such as addition/subtraction and the memory access. Concretely, the instruction after decoded is put in the fetch queue 28 and, in a case in which no dependence exists between the result of an non-executed instruction and the input data, it is placed in the execution unit (arithmetic unit) 150 for the memory access. On the other hand, if there is a dependence therebetween, it is left in the fetch queue 28 until the input data is outputted from the previous instruction.

Since the updating of a resource such as the register 13 or the main memory 21 visible to the software is required to ensure the program sequence at the occurrence of interrupt processing or the like, the output data after the execution processing is written and retained in a buffer for storing temporary data. The result of the arithmetic operation for the updating of the register 13 is stored in a register update buffer (not shown) and the data for the updating of the main memory 21 is put in a store buffer (not shown).

In the completion (commit) stage, the updating of the register 13 or the main memory 21 is made according to the program sequence (instruction decoded order). That is, the writing is made from the register update buffer into the register 13, or the writing is made from the store data buffer to the main memory 21.

Figure 4:
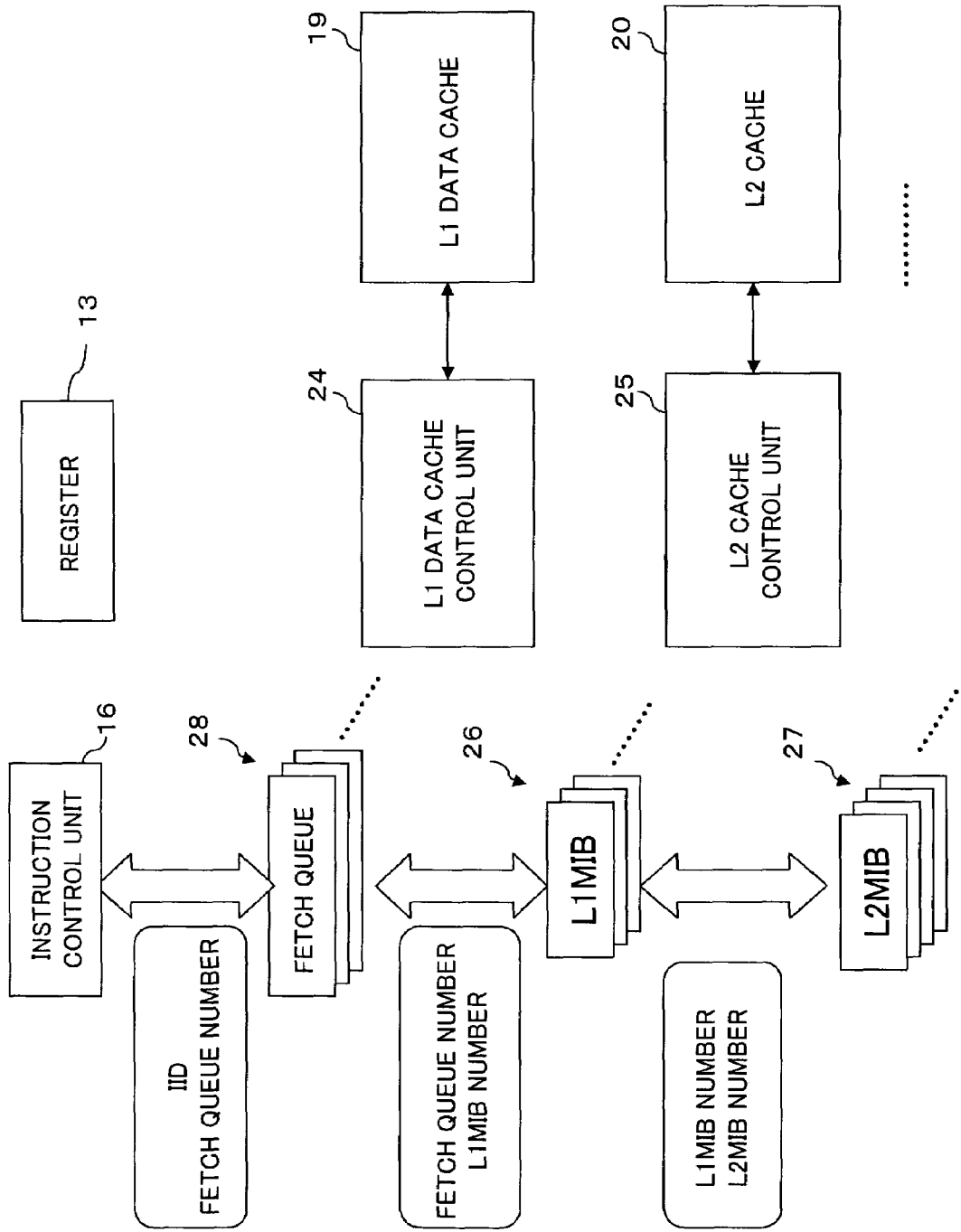
FIG. 4 is an illustration useful for explaining a control signal to be interchanged among an instruction control unit, an L1 cache control unit and an L2 cache control unit in the multithread processor according to the embodiment of the present invention.
Figure 5:
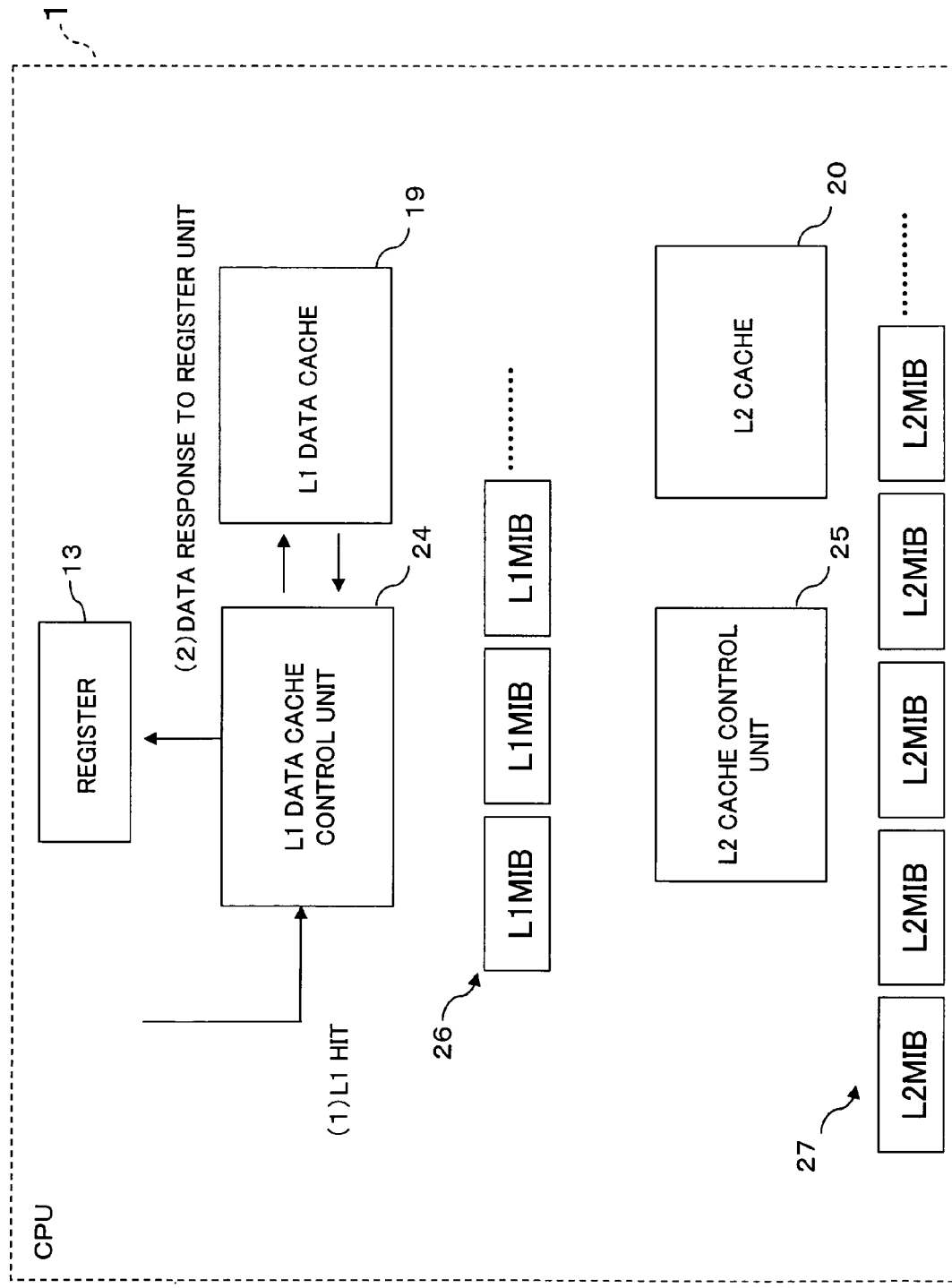
FIG. 5 is an illustration of a flow of data in the case of L1 cache hit with respect to a load instruction in the multithread processor according to the embodiment of the present invention.
Figure 6:
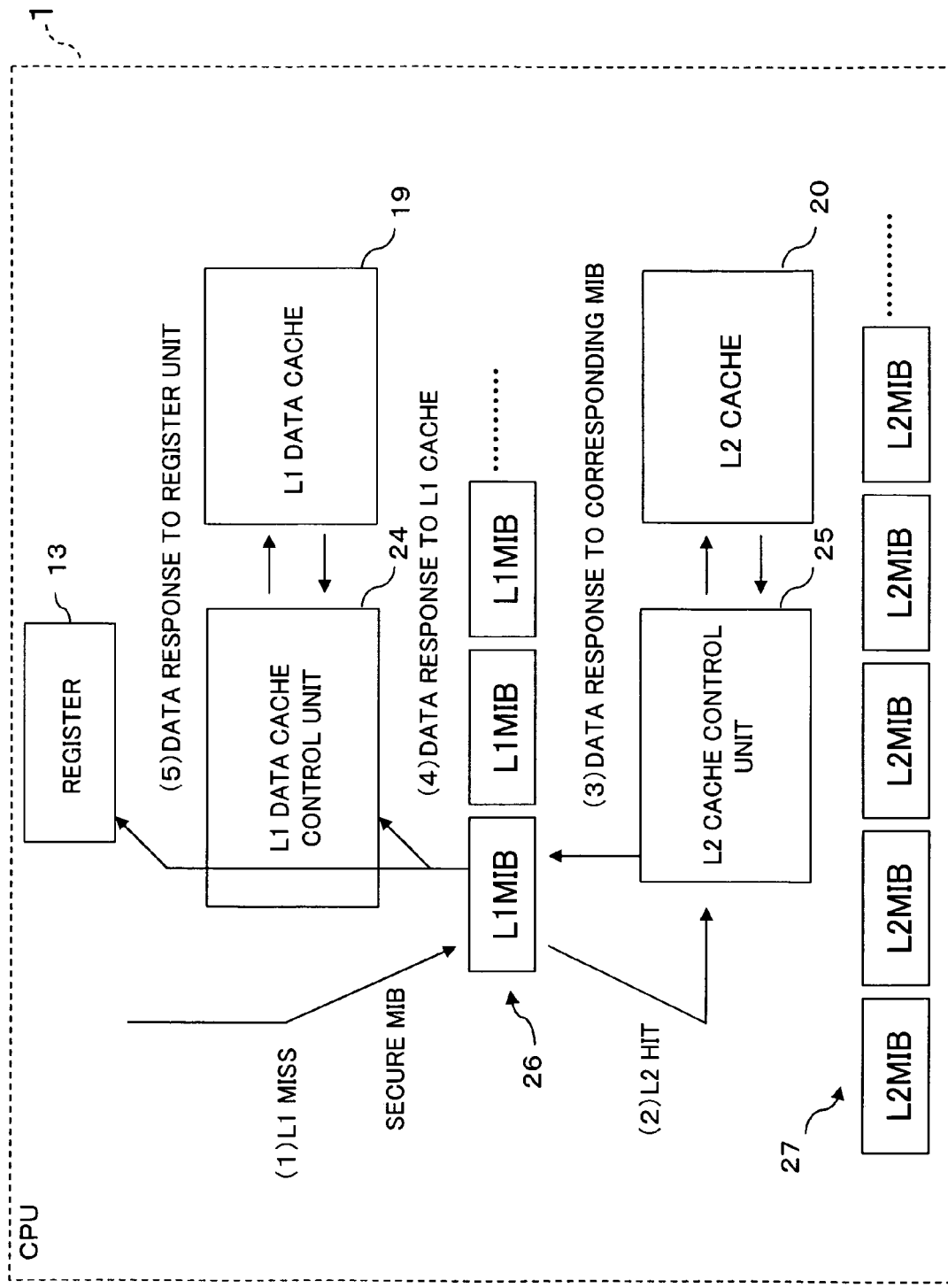
FIG. 6 is an illustration of a flow of data in the case of L1 cache miss and L2 cache hit with respect to a load instruction in the multithread processor according to the embodiment of the present invention.
Figure 7:
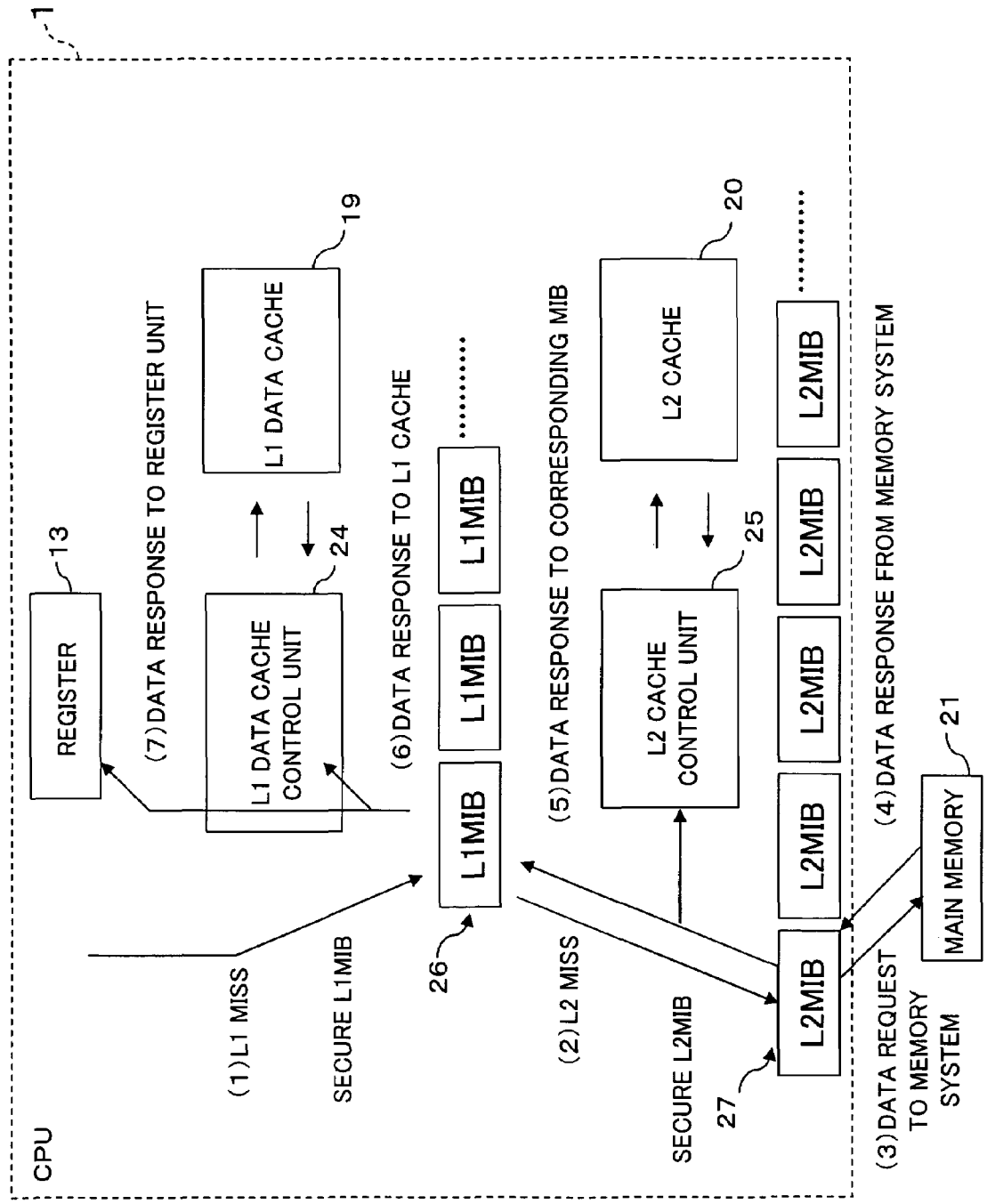
FIG. 7 is an illustration of a flow of data in the case of L1 cache miss and L2 cache miss with respect to a load instruction in the multithread processor according to the embodiment of the present invention.
Figure 8:
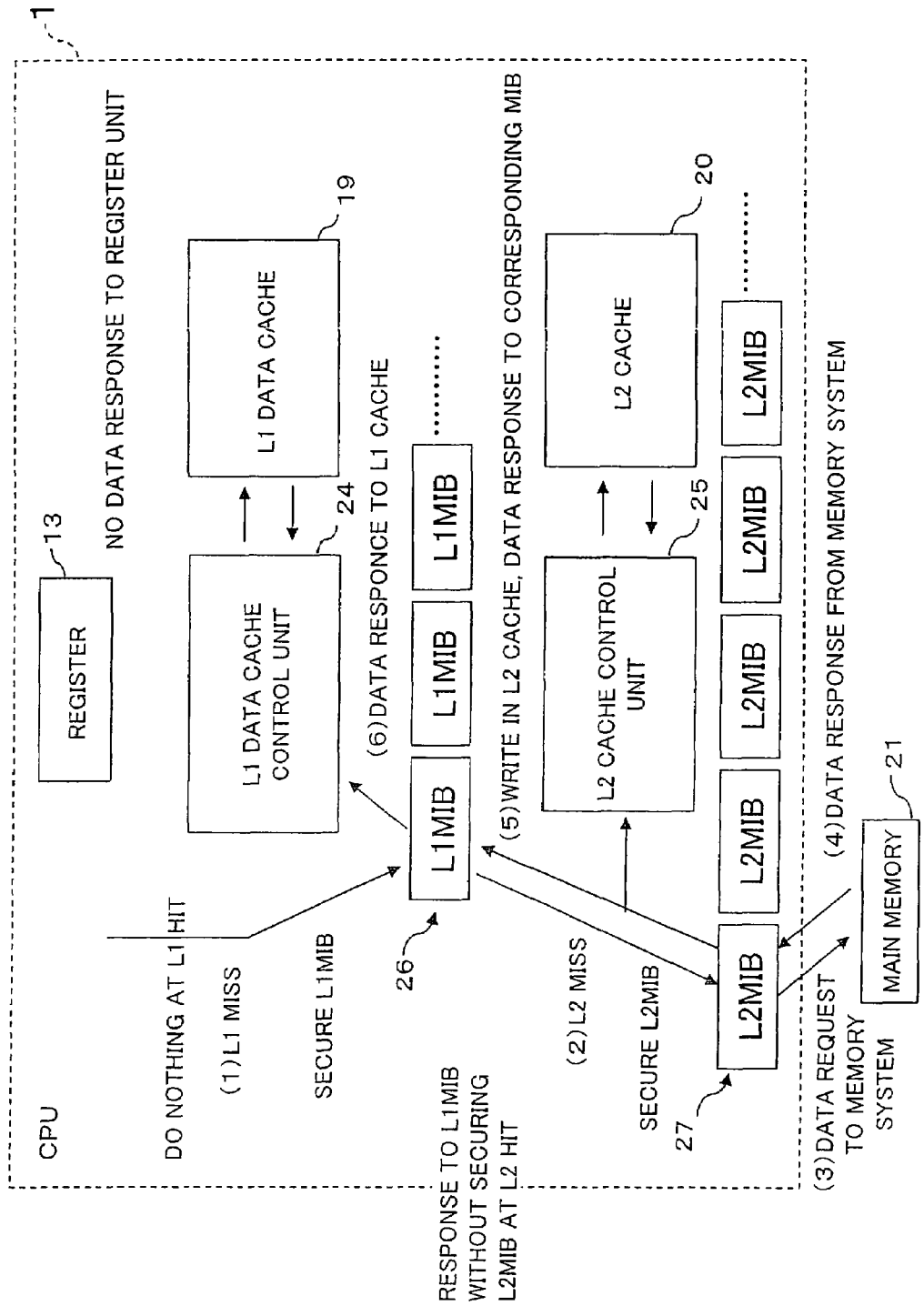
FIG. 8 is an illustration useful for explaining L1 prefetch processing.
Figure 9:
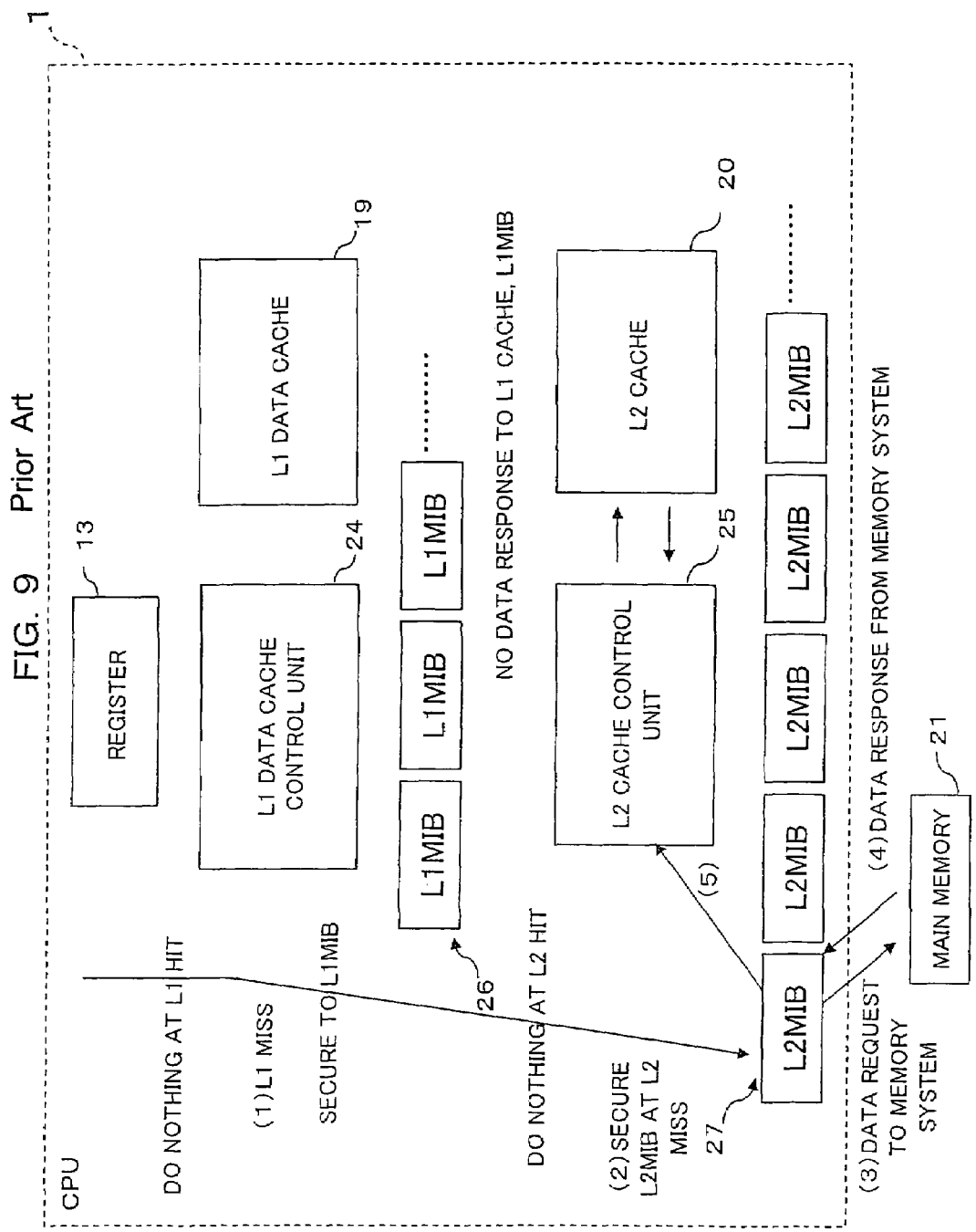
FIG. 9 is an illustration useful for explaining L2 prefetch processing.
Figure 10:
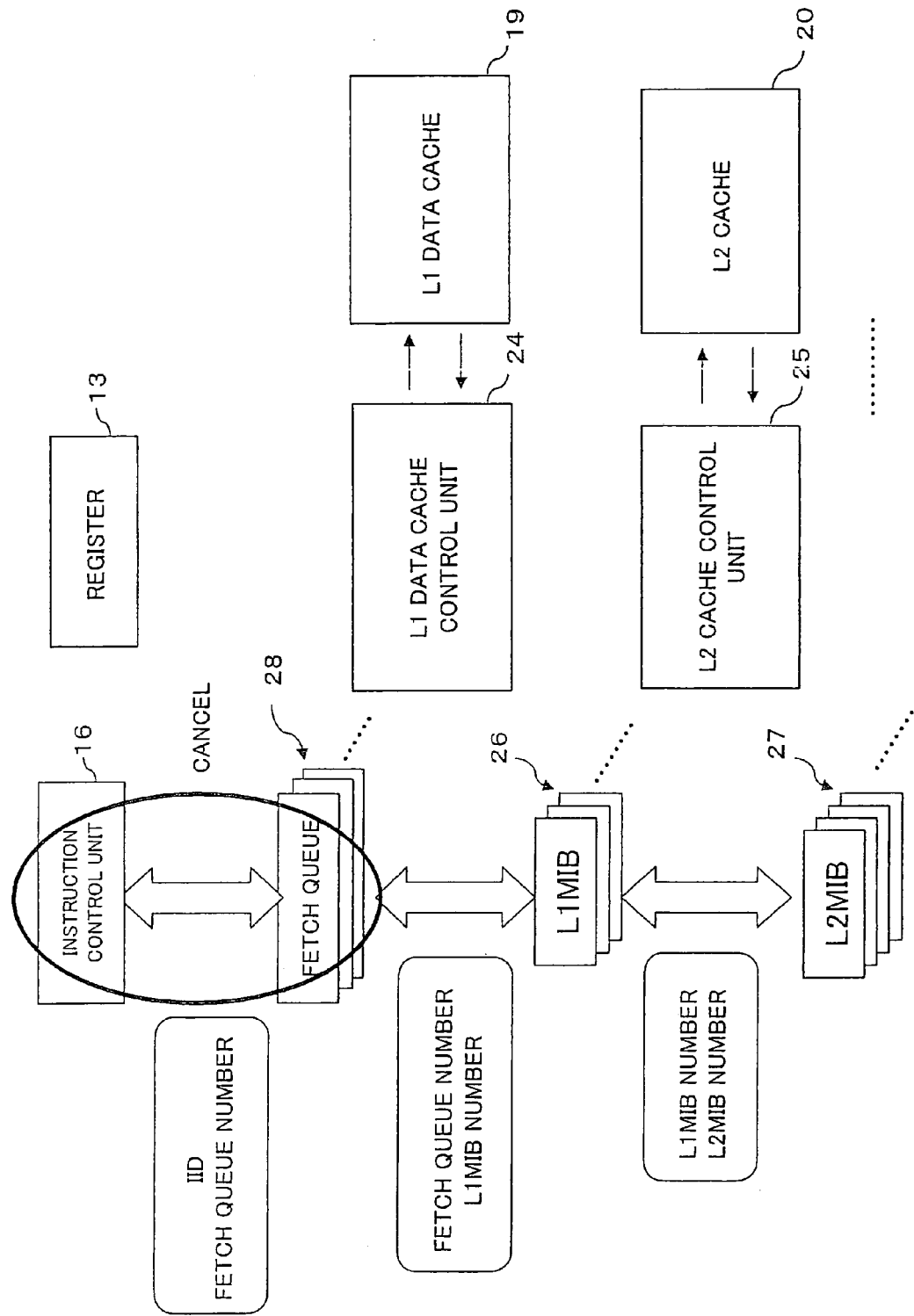
FIG. 10 is an illustration of an image of a cancellation range at the cancellation in the instruction control unit in a CPU.
Figure 11:
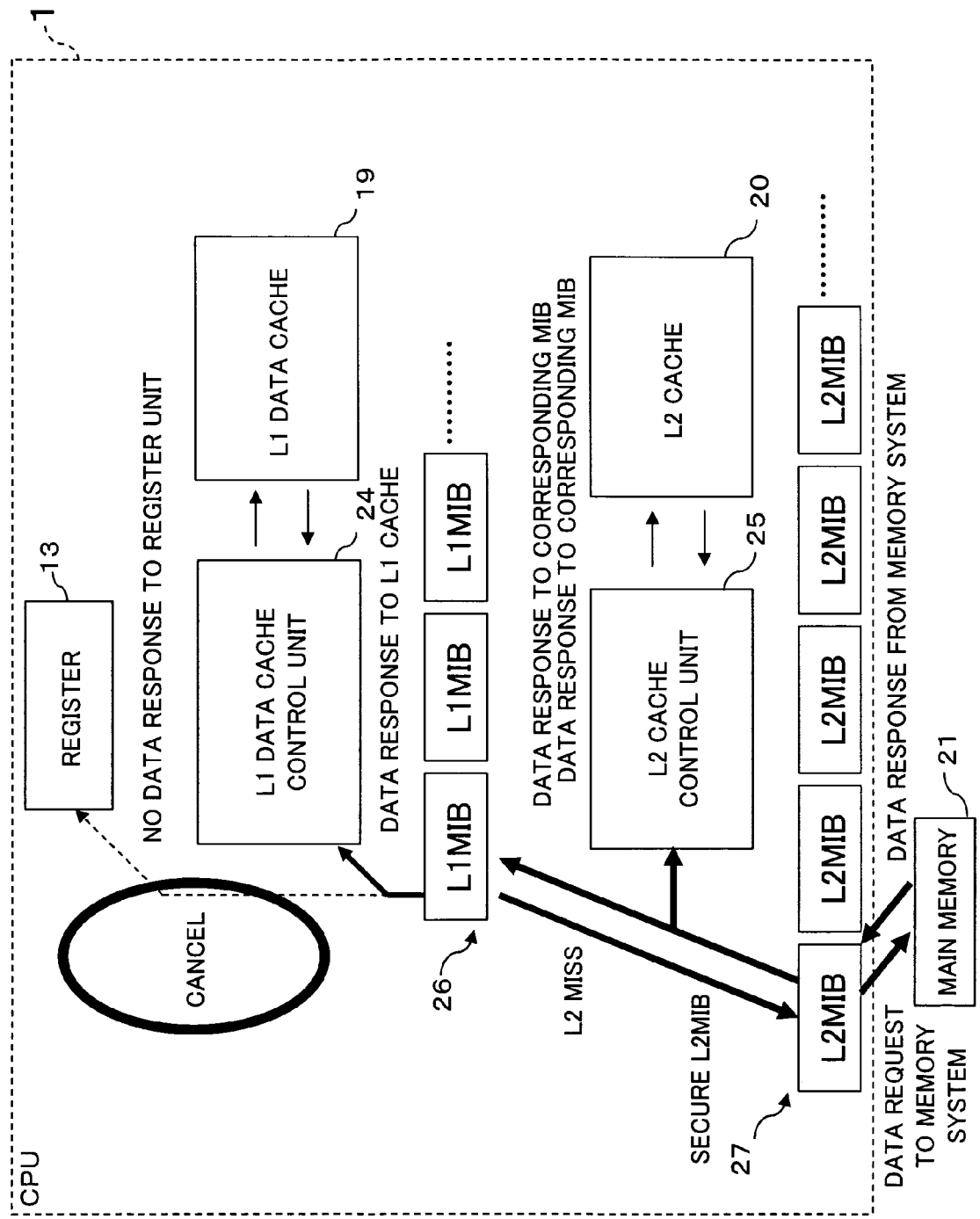
FIG. 11 is an illustration useful for explaining the processing at the cancellation in the multithread processor according to the embodiment of the present invention.

Furthermore, referring to FIGS. 4 to 11, a description will be given hereinbelow of the outline of the operations to be conducted at the access to the L1 cache, the L2 cache 20 and the main memory 21 in this CPU 1. FIG. 4 is an illustration useful for explaining the interchange of control signal among the instruction control unit 16, the L1 cache control unit and the L2 cache control unit 25 in this CPU 1, FIG. 5 is an illustration of a flow of data in a case in which an L1 cache hit occurs with respect to a load instruction in this CPU 1, FIG. 6 is an illustration of a flow of data in a case in which, with respect to a load instruction in this CPU 1, an L1 cache miss occurs and an L2 cache hit occurs, FIG. 7 is an illustration of a flow of data in a case in which, with respect to a load instruction in this CPU 1, an L1 cache miss occurs and an L2 cache miss occurs, FIG. 8 is an illustration useful for explaining the L1 prefetch processing, FIG. 9 is an illustration useful for explaining the L2 prefetch processing, FIG. 10 is an illustration of an image of a cancellation range at the cancellation of the instruction control unit in this CPU 1, and FIG. 11 is an illustration for explaining the processing to be conducted at the cancellation in this CPU 1.

As the access from the L1 cache, there are a load instruction for writing memory data certainly in the register 13 according to an instruction of a program, and a store instruction for writing data in the register 13 certainly on the main memory 21. In the description of this embodiment, the load instruction or the store instruction will sometimes be referred to as a demand request.

Moreover, as a method of covering up the time taken until data is fetched from the main memory 21 in the case of the occurrence of a cache miss, there are a prefetch instruction (software prefetch) which is a program instruction for bringing data onto the L1 cache or the L2 cache 20 in advance without writing it in the register 13, and a hardware prefetch function for detecting the regularity of the address of data, on which a cache miss occurs, through the use of hardware so that data is previously read out from the main memory 21 even when a prefetch instruction is not indicated on the program.

In the following description of this embodiment, the aforesaid prefetch instruction according to the program and prefetch (hardware prefetch function) by the hardware are collectively referred to as a prefetch request. Moreover, this prefetch request includes an L1 prefetch (L1 prefetch processing; see FIG. 8) for bringing data up to the L1 cache and an L2 prefetch (L2 prefetch processing; see FIG. 9) for bringing data only to the L2 cache 20. Incidentally, since the prefetch request is made in the cache control unit 24, the processing penalty on the cache miss does not directly affect the instruction processing.

As shown in FIG. 4, the L1 data cache control unit 24 receives, in addition to the address for the memory access, various types of information such as a load instruction, a store instruction, an instruction code including a prefetch instruction and IID needed for the execution and puts a plurality of cache access instructions in the fetch queue 28. Moreover, simultaneously, the L1 data cache control unit 24 has the access to the L1 data cache 19 and, if a cache hit occurs and it is a load instruction (see an arrow (1) in FIG. 5), supplies the data to the register 13 (see an arrow (2) in FIG. 5).

With respect to an instruction for the access to the cache at the instruction decoding, the fetch queues 28 are secured according to the program sequence. The information needed for the cache address such as address calculation is used in no relation to the program sequence, and the data response from the L1 data cache 19 to the register 13 is made in an out-of-order manner in no relation to the program sequence. The fetch queue 28 is released in the order of allocation at the instruction decoding.

As shown in FIGS. 6 to 8, at the occurrence of a cache miss, a data request is issued to the L2 cache which is at a lower place in the hierarchy. In this case, one of a finite number of MIBs (L1MIB 26, L2MIB 27; storage areas) is certainly secured for each of the demand request and the prefetch request (see an arrow (1) in FIGS. 6 to 8). Moreover, when there is a data response (see an arrow (3) in FIG. 6), the L1 cache control unit 24 makes the writing in the L1 data cache 19 (see an arrow (4) in FIG. 6) and releases the L1MIB 26 and further makes a data response to the register 13 (see an arrow (5) in FIG. 6).

When accepting a request which hits the L2 cache 20 (L2 cache hit) after a request which suffers an L2 cache miss, the L2 cache control unit 25 is made to conduct the processing for first returning the hit data. That is, a response from the L2 cache control unit 25 is made in an out-of-order manner when viewed from the L1 data cache control unit 24 (L1 data cache 19).

When a hit occurs with respect to the L2 cache 20 (see an arrow (2) in FIG. 6), with respect to a request to which the L1MIB 26 is allocated, the L2 cache control unit 25 makes a data response with an identifier (L1MIB-ID: cache request identifier) for specifying the corresponding L1MIB 26 (see an arrow (3) in FIG. 6). In the case of the occurrence of an L2 cache miss (see an arrow (2) in FIGS. 7 to 9), it secures a buffer (L2MIB 27) for once storing the response data to a request issued to the main memory and then issues a request to the main memory 21 (see an arrow (3) in FIGS. 7 to 9). The data response (see an arrow (4) in FIGS. 7 to 9) is also returned from a main memory control unit (not shown) separately from the issue order.

The data response returned in this way is stored in the L2MIB 27 and then written in the L2 cache 20 by the L2 cache control unit 25, and the L2MIB 27 is released. Following this, the data response is stored in the corresponding L1MIB 26 (see an arrow (5) in FIGS. 7 and 8). The L1 cache control unit 24 performs the writing in the L1 data cache 19 (see an arrow (6) in FIGS. 7 and 8) and releases the L1MIB 26 and further performs a data response to the register 13 (see an arrow (7) in FIG. 7).

Secondly, a description will be given hereinbelow of an L2 prefetch request.

As shown in FIG. 9, an L2 prefetch request is not written in the L1 cache 19. For this reason, there is no need to secure the L1MIB 26. Accordingly, even if all the L1MIBs 26 are occupied, the L2 prefetch request can be issued to the L2 cache 20. In the case of a hit on the L2 cache 20, the data response to the L1 data cache 19 is not made and there is no operation to be done. In the case of the occurrence of an L2 cache miss, the L2MIB 27 is secured and a request for data from the main memory 21 takes place. The L2MIB 27 is released when the data response is returned to the main memory 21 and the writing in the L2 cache 20 reaches completion.

Furthermore, a description will be given hereinbelow of a method of securing the L1MIB 26 and the L2MIB 27.

As shown in FIG. 9, when a request which has suffered an L1 cache miss tries to gain access to the L2 cache 20, if a preceding request securing the L1MIB 26 is on the same line in the L1 data cache 19, the control is conducted so as to once suspend the succeeding request which has suffered an L1 cache miss and, in the fetch queue 28, have a wait for the release of the L1MIB 26 which is the same in cache line. This is because, when a plurality of cache misses occur on the same cache line, the circuit for selecting one way at the data response becomes complicated, and the hit against the same cache line is actually a rare case. The request hitting the L1 cache 19 behaves as in the case of the ordinary hit even if existing on the same line as that of the L1MIB 26.

In a case in which, when a request related to an L2 cache miss tries to gain access to the main memory, a preceding request securing the L2MIB 27 exists on the same line in the L2 cache 20, the control is implemented so as to once suspend the succeeding request related to the L2 cache miss and, in the fetch queue 28, have a wait for the release of the L2MIB 27 which is the same in cache line. A request hitting the L2 cache behaves as in the case of the ordinary hit (for example, a data response) regardless of whether or not it exists on the same cache line as that of the L2MIB 27.

In a case in which a branch prediction miss occurs or an instruction execution for entering a trap processing routine is canceled, as shown in FIG. 10, the instruction control unit 16 invalidates the information existing in the fetch queue 28. That is, the writing in the register does not take place. However, if the L1MIB 26 has already been secured at the cancellation, with respect to a demand request activating an L2 cache access and an L1 prefetch request, the operation up to the writing in the L1 cache takes place. Moreover, with respect to the L2 prefetch, the operation up to the writing in the L2 cache 20 takes place (see FIG. 11).

The multithread control unit 11 is for selectively switching a thread which is an object of processing in the execution unit 150. Moreover, the multithread control unit 11 is made to control the data transfer between the register (register window) 13 and the execution unit 150 on the basis of an identifier (execution thread identifier) for identifying a thread to be executed in the execution unit (arithmetic unit) 150.

In addition, the multithread control unit 11 is made to set identifiers (thread identifiers) for respectively identifying a plurality of threads to be executed in parallel in this CPU 1 and, with respect to instructions on these threads, further to set an identifier (thread identifier) indicative of a thread to which one instruction pertains.

Still additionally, when a cache miss occurs on an instruction to be next completed, the multithread control unit 11 carries out the control for the switching between the threads on the basis of an instruction identifier or a thread identifier notified from the L1 instruction cache control unit 23 or the L1 data cache control unit 24.

Figure 12:
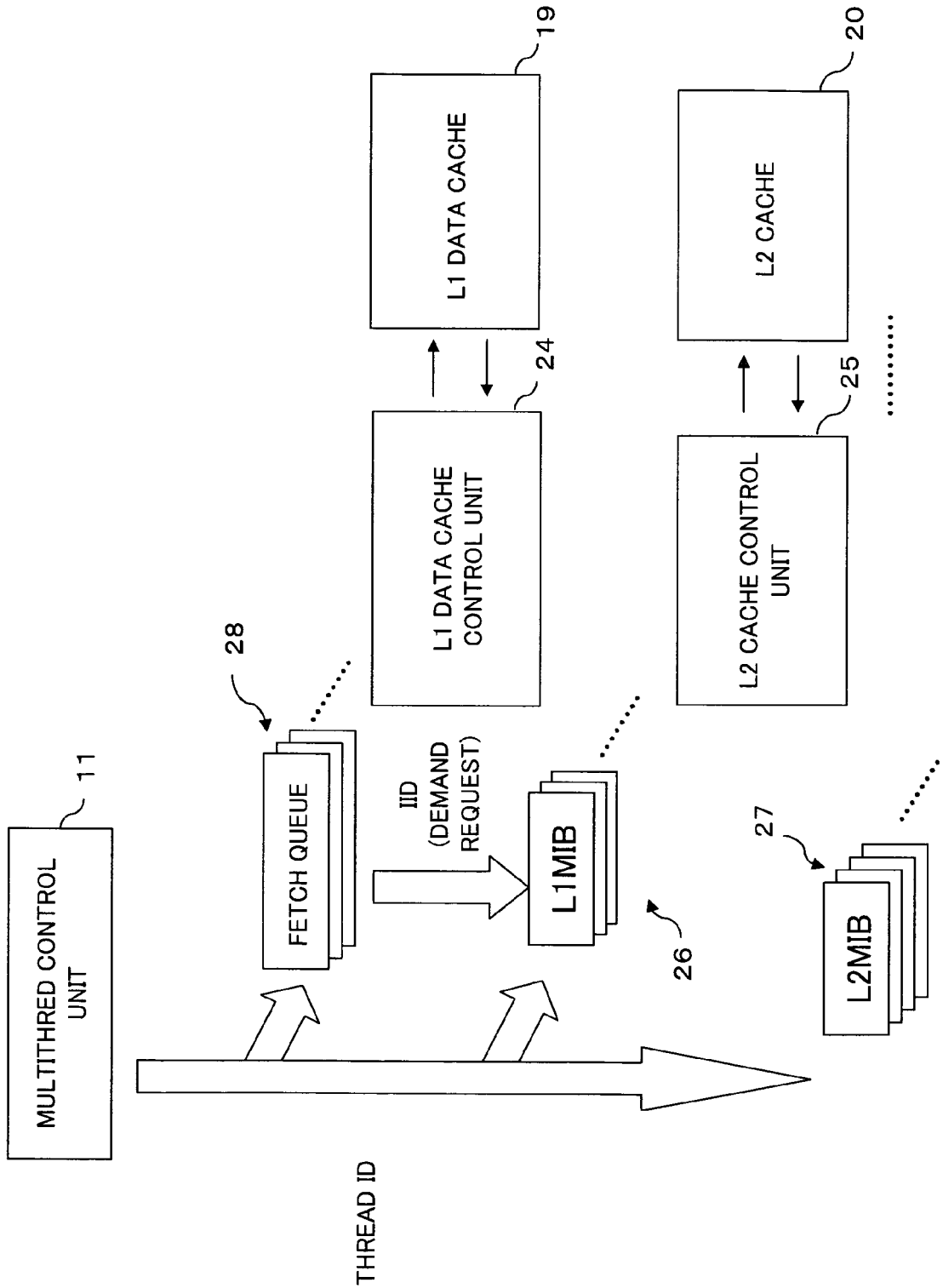
FIG. 12 is an illustration of a flow of a multithread control signal from a multithread control unit to an L1 data cache control unit and an L2 cache control unit in the multithread processor according to the embodiment of the present invention.
Figure 13:
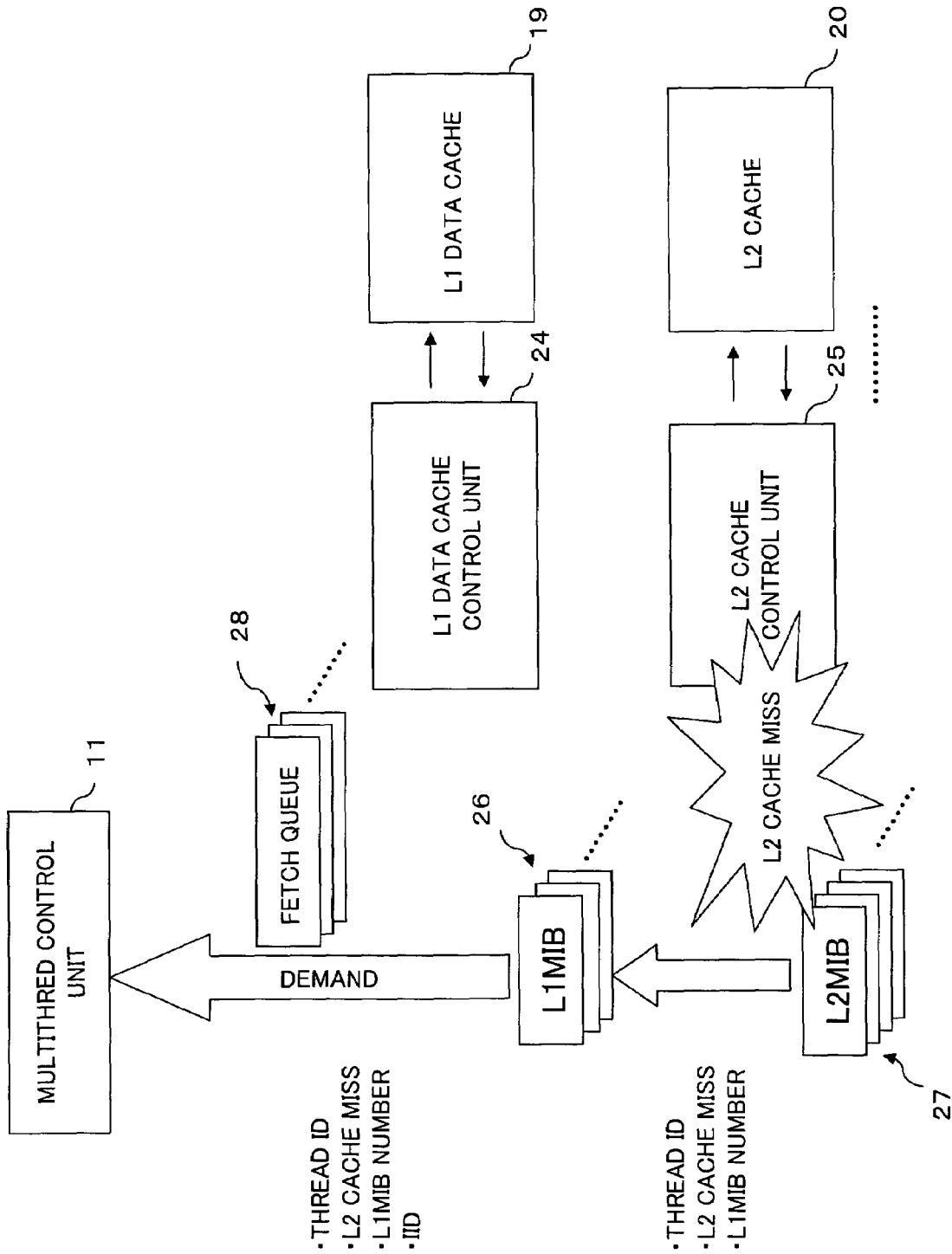
FIG. 13 is an illustration useful for explaining a method for the notification to the multithread control unit at an L2 cache miss in the multithread processor according to the embodiment of the present invention.

FIG. 12 is an illustration of a flow of a multithread control signal from the multithread control unit 11 to the L1 data cache control unit 24 or the L2 cache control unit 25 in this CPU 1, and FIG. 13 is an illustration useful for explaining a method of reporting to the multithread control unit 11 at the occurrence of an L2 cache miss in this CPU 1.

As FIG. 12 shows, the multithread control unit 11 is made to send the identifier (thread identifier) of the running thread to the L1 data cache control unit 24 and the L2 cache control unit 25. Moreover, the L1 data cache control unit 24 is made to, when an L2 cache request secures the L1MIB 26, register the thread identifier for that instruction (request) in the L1MIB 26. Still moreover, for example, if an instruction is a demand request, it registers a flag or IID (instruction identifier) indicative of the request on the demand.

As FIG. 13 shows, when detecting an L2 cache miss, with respect to a demand request securing the L1MIB 26 or an L1 prefetch request, the L2 cache control unit 25 transmits, to the L1 data cache control unit 24, an L1MIB-ID (L1MIB number; cache request identifier), as a cache access request identifier, and a flag indicative of the occurrence of the L2 cache miss along with the thread ID on that instruction.

On the other hand, as shown in FIG. 13, the L1 data cache control unit 23 sets a flag indicative of the occurrence of an L2 cache miss with respect to the L1MIB 26 in which the L2 cache miss has occurred. Moreover, for example, in a case in which the instruction related to the L1MIB 26 is a demand request, it transmits the thread ID, the IID, the L1MIB-ID and the L2 cache miss flag to the multithread control unit 11.

That is, in a case in which the instruction is an instruction of a thread and a demand request which raises the interchange of data between a register for storing data for the arithmetic operations in the arithmetic unit 150 and the main memory (external storage unit) 21 existing in the exterior of the multithread processor, the L1 data cache control unit 24 notifies the thread identifier, cache request identifier and instruction identifier related to that instruction to the multithread control unit 11.

Incidentally, the prefetch request is issued for the purpose of covering up the penalty on a demand request suffering a cache miss, and an operation for writing in a cache is conducted by the cache control unit and, also in the case of waiting for data from the main memory 21, the penalty is invisible to the instruction control unit 16. For this reason, the report on an L2 cache miss (notification of thread-ID, IID and L1MIB-ID) is not made up to the instruction control unit 16.

In addition, with respect to a store instruction, even if a cache miss occurs on the store object address, the instruction control unit 16 carries out the detachment control to complete the store instruction without waiting for the data response on the corresponding address from the L2 data cache 19 or the main memory 21.

Figure 14:
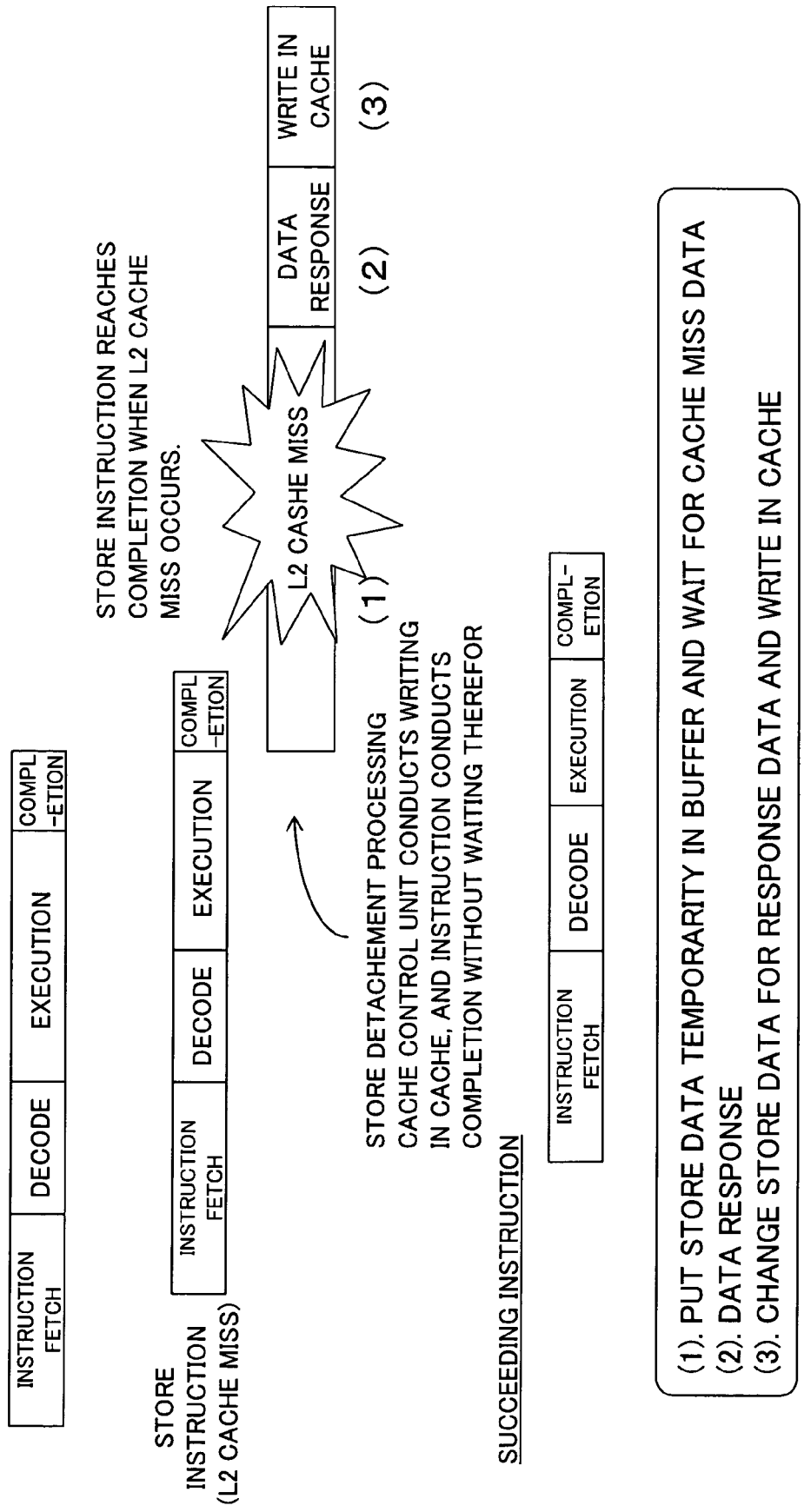
FIG. 14 is a pipeline illustration useful for explaining store instruction detachment control in the multithread processor according to the embodiment of the present invention.

FIG. 14 is a pipeline illustration useful for explaining the detachment control on a store instruction in this CPU 1. This detachment control is such that, when the instruction control unit 16 completes a store instruction, the cache control unit 24 puts the store data in a dedicated buffer (not shown) and, when the data on an address to be data-written is returned to the L1 data cache 19, the L1 data cache control unit 24 updates the data.

That is, in the background, the operation is conducted to (1) put the store data temporarily in the buffer and have a wait for the cache miss data, (2) when a data response takes place, and (3) alter the store data with respect to the response data and write it in a cache.

The penalty due to a cache miss of a store instruction is directly invisible to the instruction control unit 16 and, at the detection of the cache miss at the lowest place in the hierarchy (in this embodiment, L2), the IID is already updated.

Moreover, the report on an L2 cache miss is held back with respect to the store instruction forming a demand request. Concretely, the L1 data cache control unit 24 sets, in the L1MIB 26, a flag indicative of whether that request is a store instruction when securing the L1MIB 26 and, when this flag is in the set condition, holds back the report to the multithread control unit 11.

Figure 15:
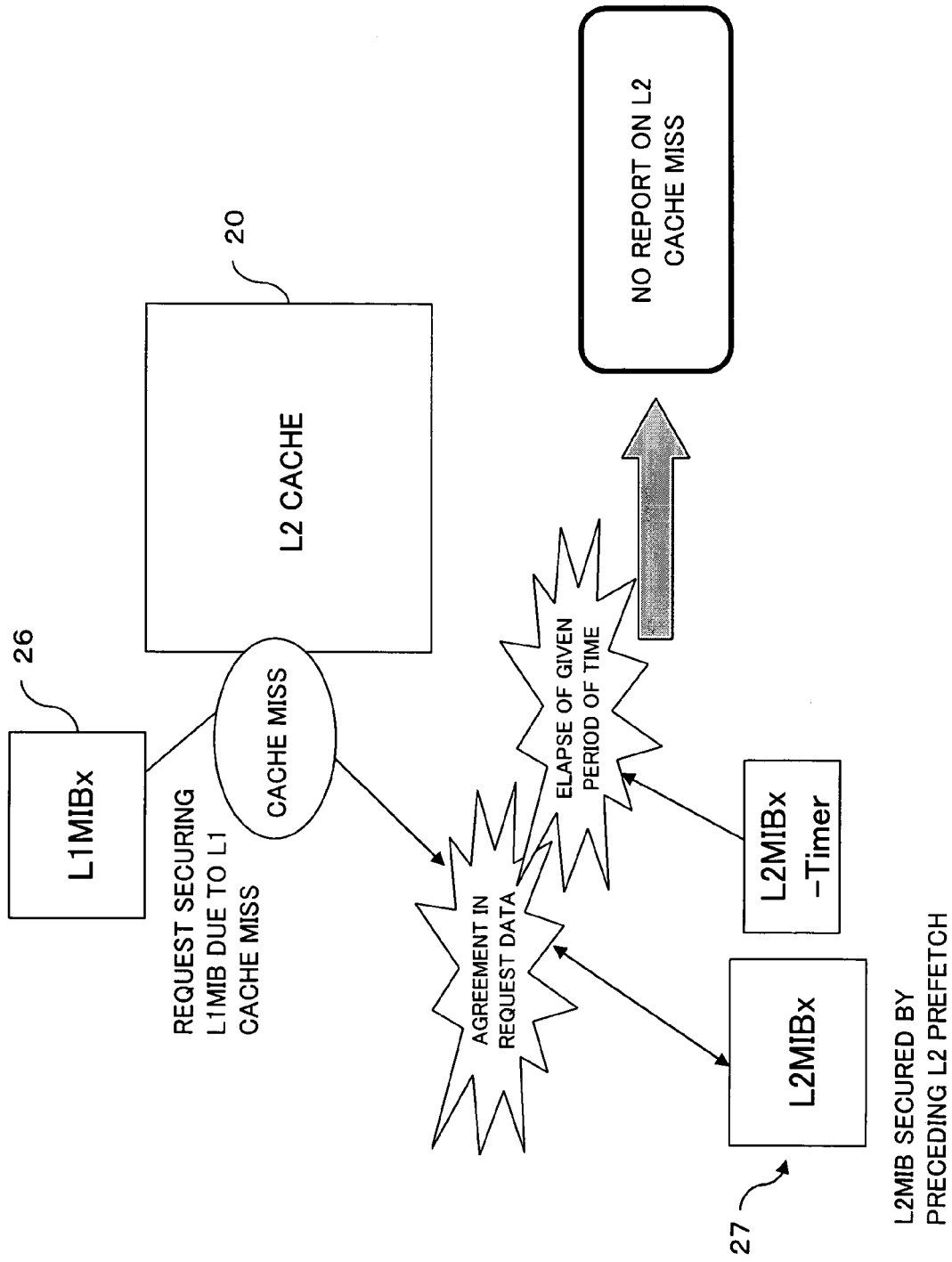
FIG. 15 is an illustration useful for explaining the processing at L2 cache miss in the multithread processor according to the embodiment of the present invention.

FIG. 15 is an illustration useful for explaining the processing at the occurrence of an L2 cache miss in this CPU 1.

In a case in which, when an L2 prefetch secures the L2MIB 27, a succeeding demand request or L1 prefetch request appears on the same cache line so that an L2 cache miss occurs, although, as mentioned above, the request cannot be issued up to the main memory until the previously issued prefetch releases the L2MIB 27, the report to the effect that an L2 cache miss occurs on a succeeding instruction securing the L1MIB 26 is made to the L1 cache.

In addition, when the response data in the prefetch is used as a succeeding request data, as shown in FIG. 15, the elapsed time after the preceding prefetch secures the L2MIB 27 is monitored through the use of a timer (L2MIBx-Timer) or the like, and the control in which the L2 cache miss is not reported is feasible on the presumption that, when the elapsed time exceeds a given period of time, the response is soon made from the main memory.

That is, the L2 cache control unit 25 monitors the elapsed time after a prefetch request is issued to the main memory 21 and, when the data to be accessed according to that instruction agrees with the data acquired from the main memory 21 according to the preceding prefetch request and the elapsed time exceeds a predetermined time, performs no notification on the thread ID, L1MIB-ID and IID related to the instruction to the multithread control unit 11.

Figure 16:
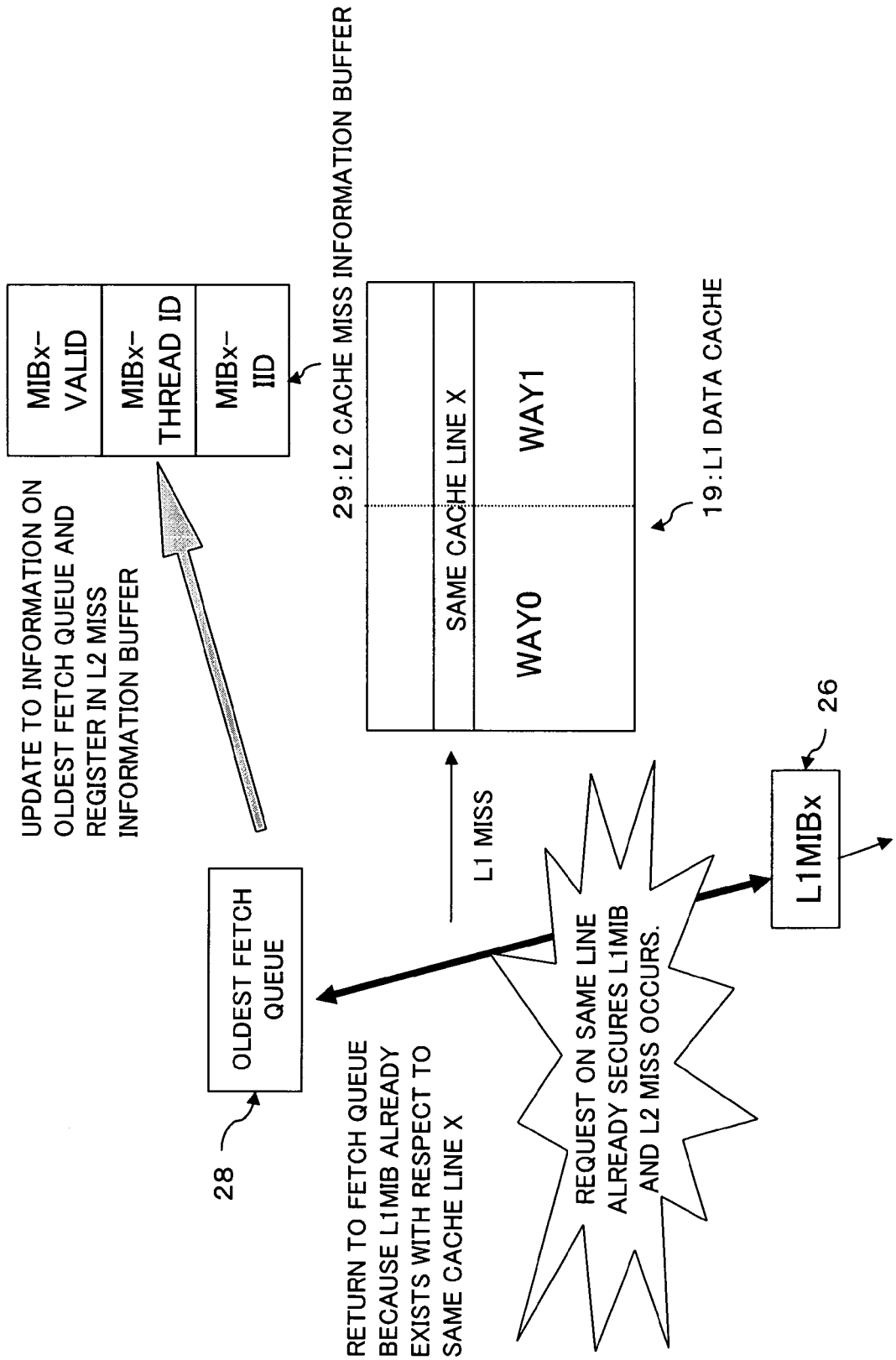
FIG. 16 is an illustration useful for explaining a method for the notification to the multithread control unit in the multithread processor according to the embodiment of the present invention.

FIG. 16 is an illustration useful for explaining a method of reporting to the multithread control unit 11 in this CPU 1.

In the fetch queue 28, let it be assumed that a cache line allocated to the leading (oldest) demand request (which will be referred to hereinafter as a demand request A for convenience only) on the L1 data cache 19 is the same as a cache line (in the example of FIG. 16, the cache line X) allocated to a demand request or L1 prefetch request (hereinafter referred to as a request B) which succeeds the demand request A in the program sequence and suffers an L1 cache miss prior to the demand request A and which is issued to the L2 cache 20 after the L1MIB 26 is secured therefor, and an L2 miss flag is set in the L1MIB 26 related to the request B.

In this condition, the L1 data cache control unit 24 is made to notify, to the thread control unit 11, the thread identifier and IID related to the demand request A along with the L1MIB-ID related to the request B in place of the thread identifier and IID registered in the L1MIB 26.

That is, in a case in which a demand request first secures the L1MIB 26, the report to the effect that the L2 cache miss has occurred twice in different IIDs relative to the same L1MIB-ID is made to the multithread control unit 11. As will be mentioned later, the thread switching due to the L2 cache miss is made when, of the requests suffering a cache miss, the oldest instruction in the program sequence comes into a next completion condition and, hence, the oldest request in the fetch queue 28 is reported preferentially.

According to these modes, also in a case in which the previously issued L1 prefetch is not issued to the L2 cache 20 or because of developing first due to the out-of-order processing, the succeeding demand request in the program sequence is not issued thereto because of the collision of the cache line, the fact that the oldest request in the fetch queue 28 waits for the other L2 cache miss processing is detected and reported to the multithread control unit 11.

The multithread control unit 11 considers that an L2 cache miss occurs on the leading demand request A in the fetch queue 28, thus carrying out the thread switching. This enables the data response waiting time related to the request B to be used for the other thread processing.

That is, only when, during a time of waiting for the data response up to the L1 data cache 19 because the preceding demand request or L1 prefetch request suffers an L1 cache miss, the succeeding demand request or L1 prefetch request experiences a cache miss on the same cache line in the L1 data cache 19, the L1 data cache control unit 24 does not issue the request to the L2 cache 20, and if the succeeding demand request is the oldest cache request in the program sequence and the preceding L2 cache request suffers an L2 cache miss, the L1 data cache control unit 24 makes a decision that the succeeding demand request waits for the L2 cache miss processing, and reports the thread identifier, the instruction identifier and the cache request identifier for the preceding request on the same cache line to the multithread control unit 11.

Figure 17:
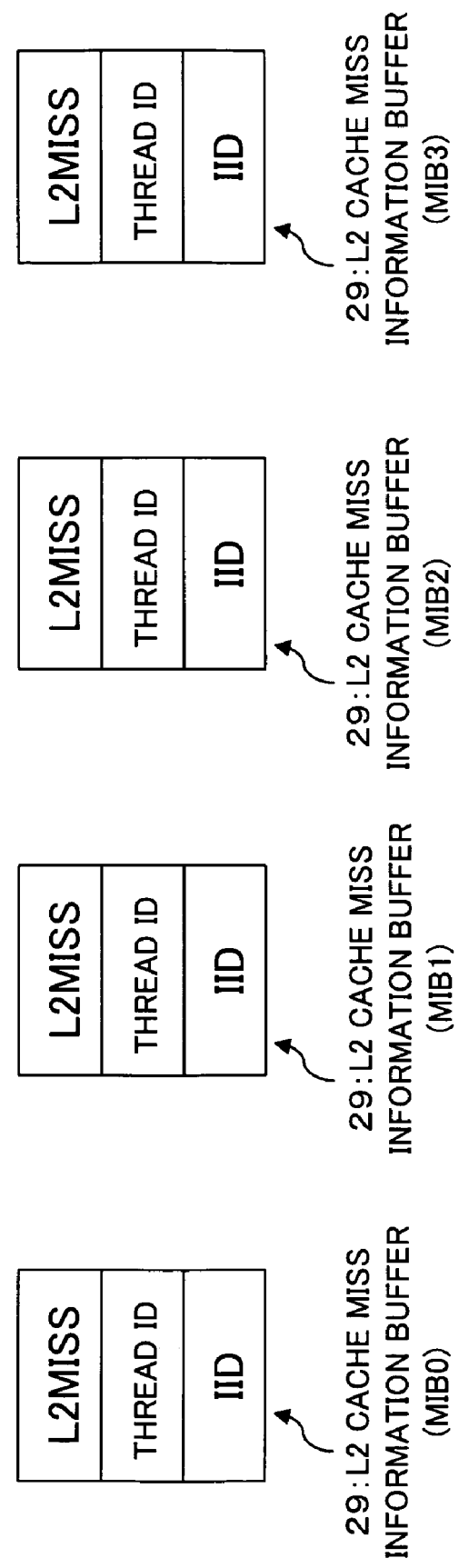
FIG. 17 is an illustration of an example of an L2 cache miss information buffer of the multithread control unit in the multithread processor according to the embodiment of the present invention.

FIG. 17 is an illustration of an example of an L2 cache miss information buffer in the multithread control unit 11 of this CPU 1.

In this CPU 1, the multithread control unit 11 is equipped with L2 cache miss information buffers (cache miss information storing units) 29, shown in FIG. 17, equal in number to the L1MIBs 26 (in the example shown in FIG. 17, L1MIB0 to L1MIB3: four in total). Each of the L2 cache miss information buffers 29 is arranged such that a flag (L2MISS) indicative of the occurrence of an L2 cache miss, the thread ID and the IID are registered in a state associated with the L1MIB 26. That is, the L2 cache miss information buffer 29 is a buffer for retaining the IID involved in the report on the occurrence of an L2 cache miss, with the number of the L2 cache miss information buffers 29 being equal to that of the L1MIBs.

The multithread control unit 11 decodes the L1MIB-ID sent simultaneously with the IID from the L1 data cache control unit 24 to write the IID in the corresponding L2 cache miss information buffer, and sets the flag on the L2 cache miss. Moreover, in a case in which the report to the same L1MIB is made plural times, it is overwritten at all times.

The L2 cache miss information buffer 29 is set according to the logic expressed by the following equations (1) and (2).

SET–MIB(N)–L2MISS=L2MISS & MIB–ID–EQ–N    (1)

RESET–MIB(N)–L2MISS =(L2MISS–DATA–RETURN & MIB–ID–EQ–N) or CANCEL    (2)

where N denotes L1MIB-ID (number of L1MIB).

Figure 18:
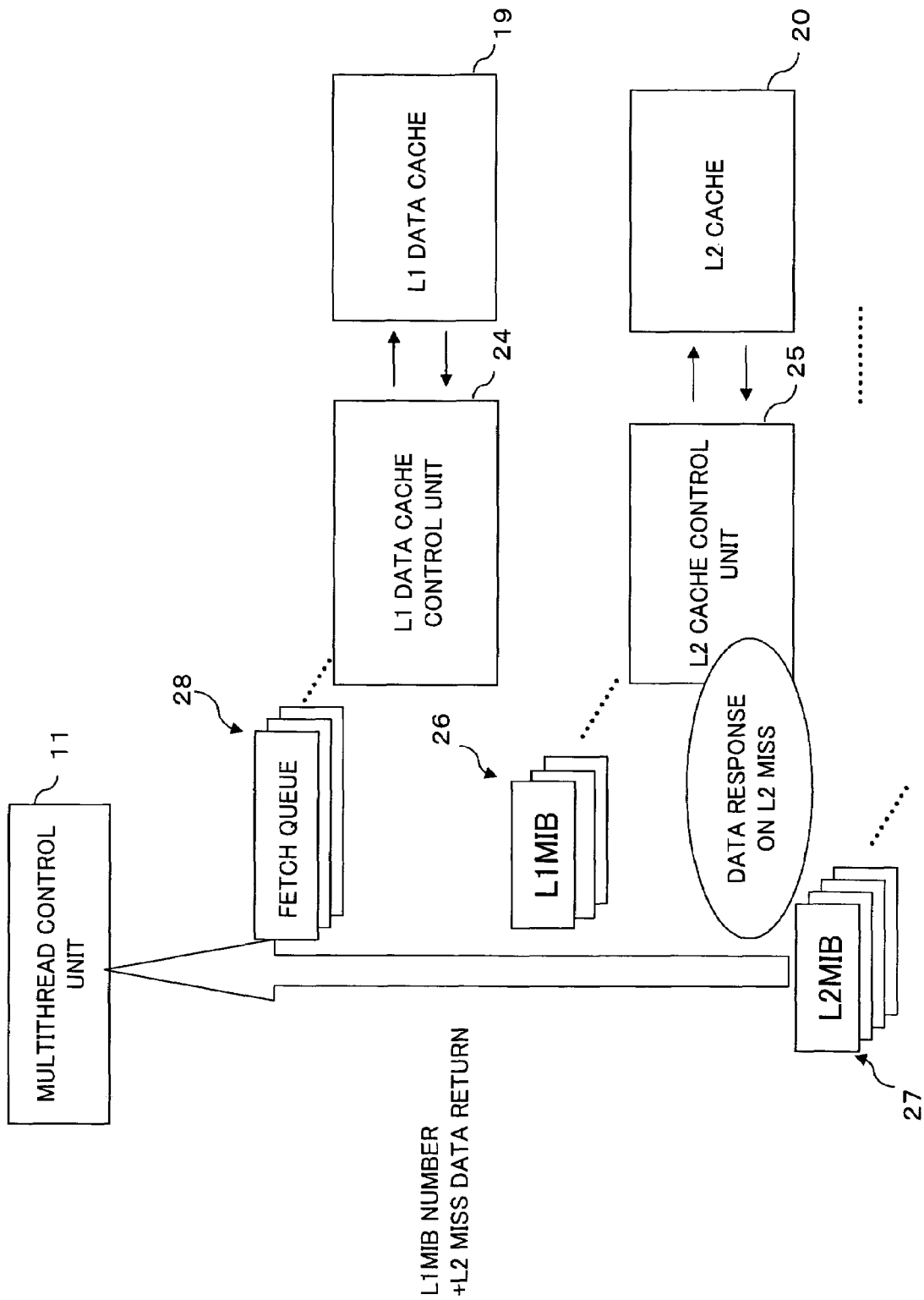
FIG. 18 is an illustration of the processing at data response to the L2 cache in the multithread processor according to the embodiment of the present invention.

FIG. 18 is an illustration of the processing at a data response to the L2 cache in this CPU 1. When the data on an instruction (request) on which an L2 cache miss occurs is given as a response from the main memory 21, a flag (L2 miss data return) indicative of a response on the L2 cache miss data and the corresponding to request identifier L1MIB-ID (L1MIB number) are transmitted from the L2 cache control unit 25 to the L1 data cache control unit 24. The L1 data cache control unit 24 transmits this signal to the multithread control unit 11 without change.

Upon receipt of this signal therefrom, the multithread control unit 11 resets the L2 cache miss flag in the corresponding L2 cache miss information buffer 29.

In addition, in a case in which the operation enters the branch prediction miss or trap processing and the request on which an L2 cache miss occurs is canceled, the thread switching processing is not conducted with respect to the canceled request. Therefore, if the L2 cache miss flag in the L2 cache miss information buffer (L1 MIB thread switching control buffer) 29 is already in the ON state, it is reset. Still additionally, after the acceptance of the cancellation, the L1 cache unit does not report the cache miss accepted in the past and the L2 cache miss of the cache request to the multithread control unit 11.

Figure 19:
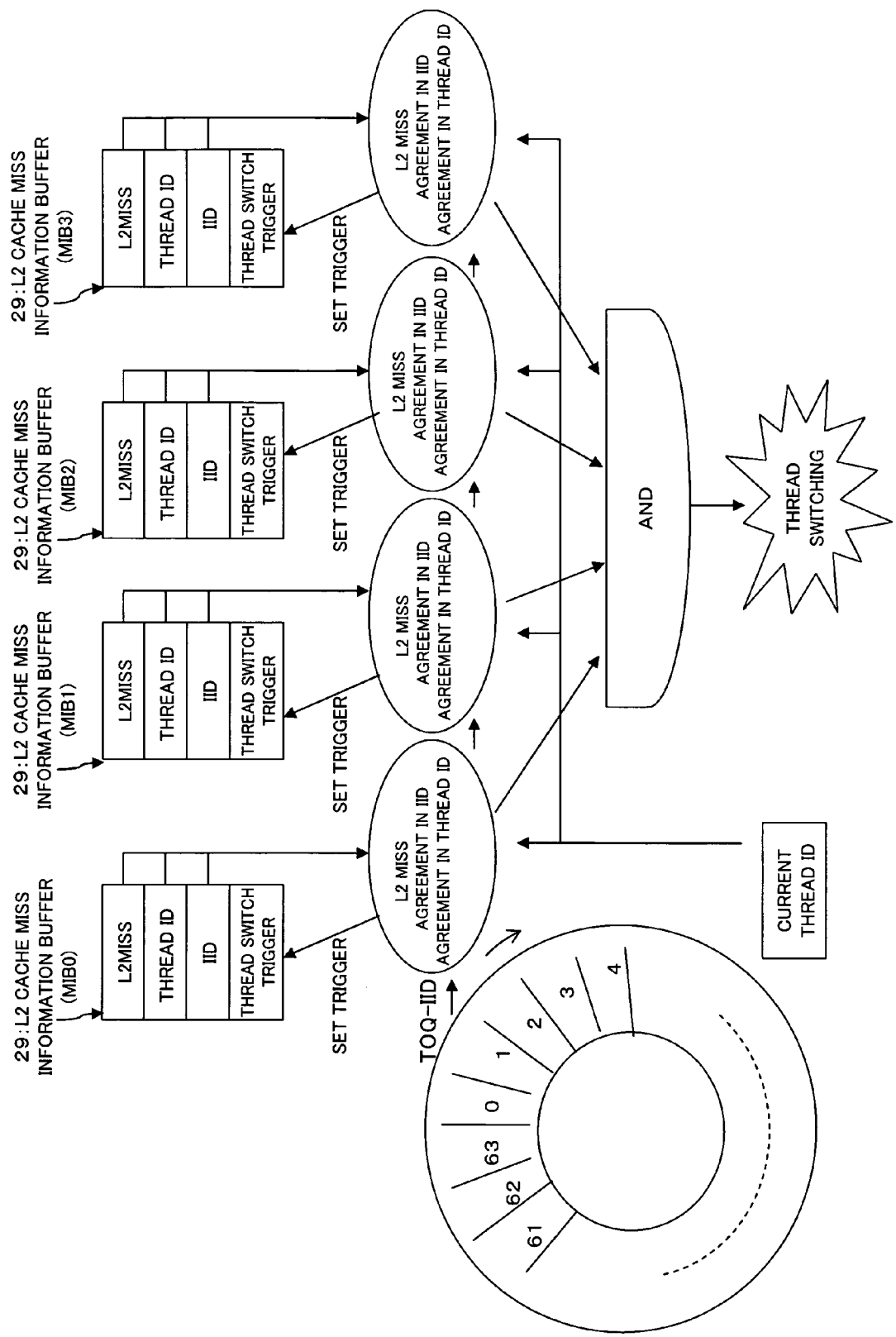
FIG. 19 is an illustration useful for explaining a method for the thread switching due to an L2 cache miss in the multithread processor according to the embodiment of the present invention.

FIG. 19 is an illustration useful for explaining a method for the thread switching stemming from the occurrence of an L2 cache miss in this CPU 1.

As FIG. 19 shows, the multithread control unit 11 monitors the IID of an instruction to be committed next in terms of the instruction completion (commit) and, when the L2 cache miss flag in the L2 cache miss information buffer 29 is in the ON state and the IID agrees with the IID retained in the buffer, carries out the switching from the running thread to another thread.

That is, the multithread control unit 11 carries out the thread switching in a case in which a cache miss occurs on an instruction to be next instruction-completed.

Moreover, at this time, a flag indicative of a cache request for the L1MIB 26 which acts as a thread switching trigger is set in the MIB thread switching control buffer. Still moreover, the flag representative of this switching trigger is reset when the thread is returned.

Figure 20:
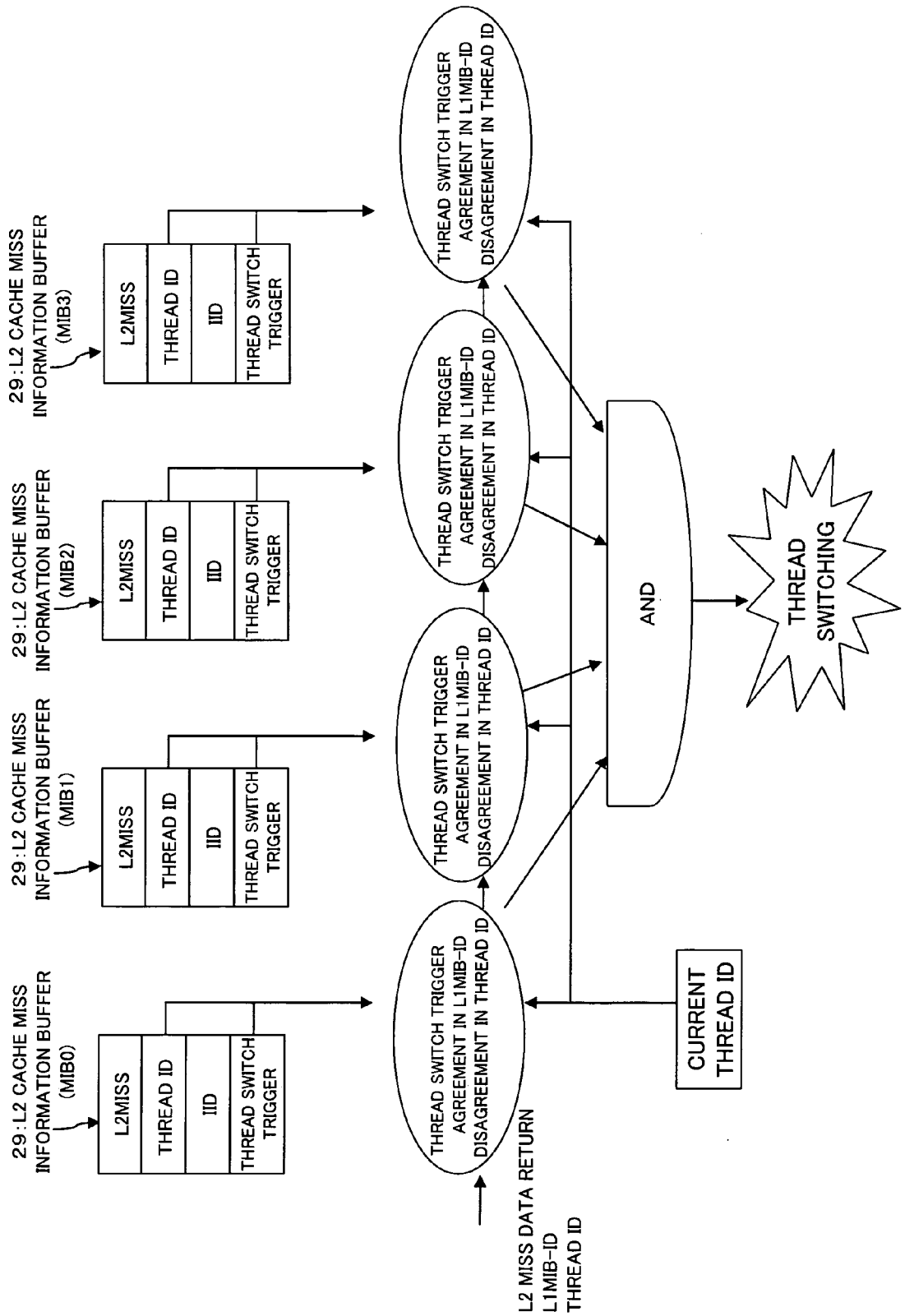
FIG. 20 is a conceptual view showing a method for the thread switching in the multithread control unit in the multithread processor according to the embodiment of the present invention.

FIG. 20 is a conceptual view showing a method for the thread switching in the multithread control unit 11 in this CPU 1. As shown in FIG. 20, when the miss data return and the MIB-ID from the L2 cache control unit 25 are accepted, if the switching trigger flag is in the ON state, the thread switching is made as the processing on the instruction on which a cache miss occurs is resumable, and the thread corresponding to the thread ID retained in the L2 cache miss information buffer 29 is returned.

Figure 21:
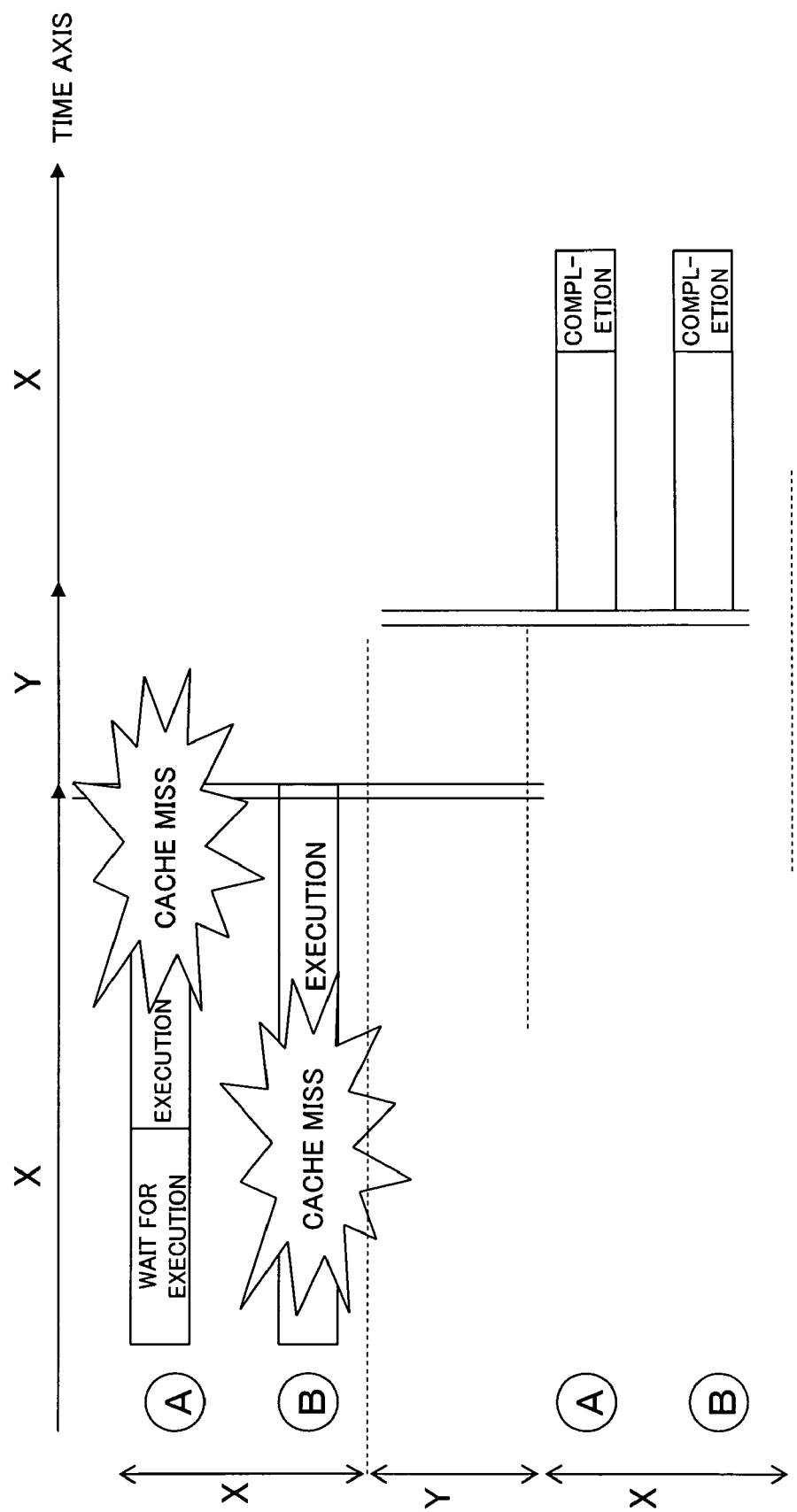
FIG. 21 is an illustration of a thread switching timing in the multithread processor according to the embodiment of the present invention.
Figure 22:
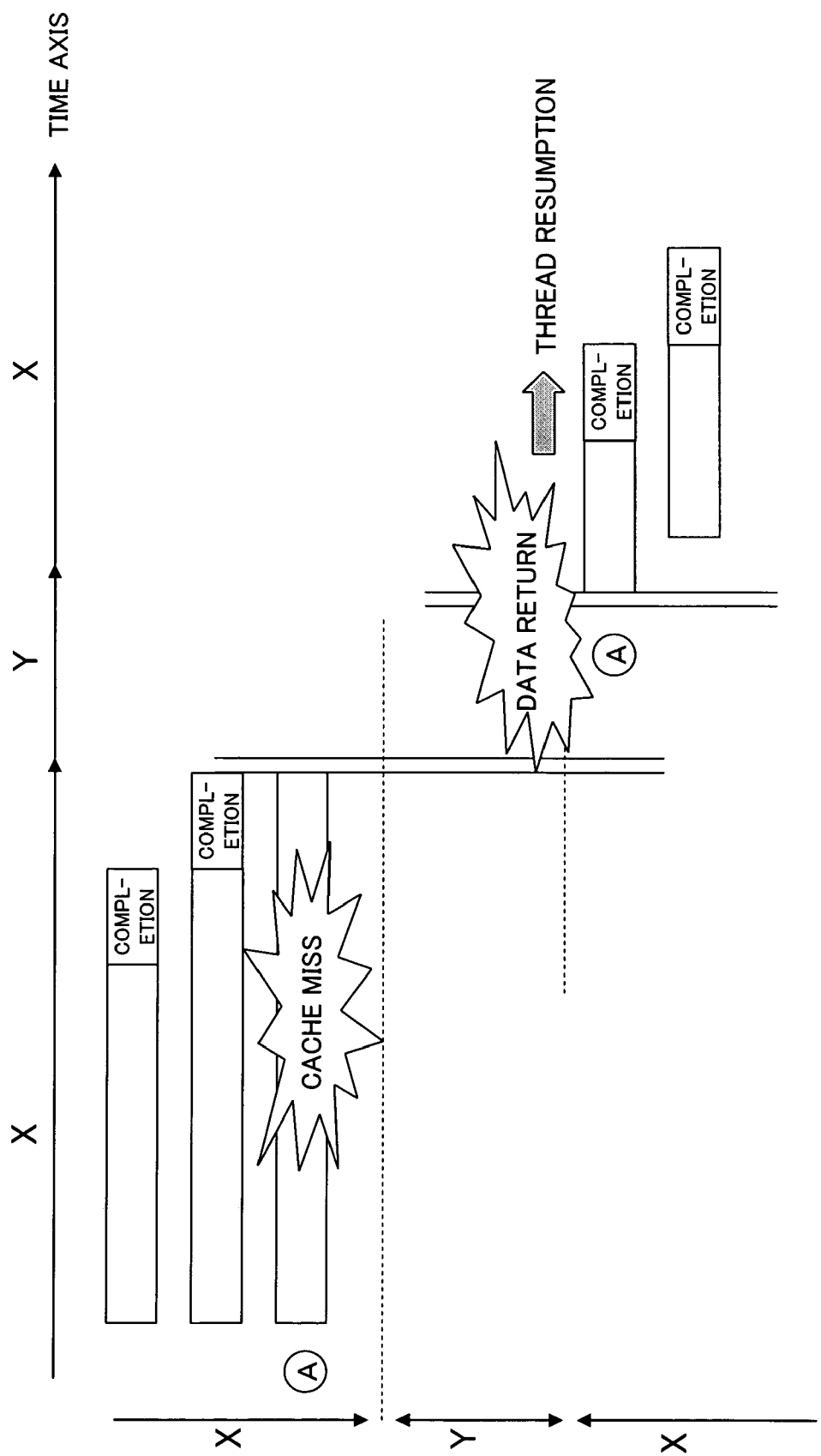
FIG. 22 is an illustration of the processing at thread resumption in the multithread processor according to the embodiment of the present invention.
Figure 23:
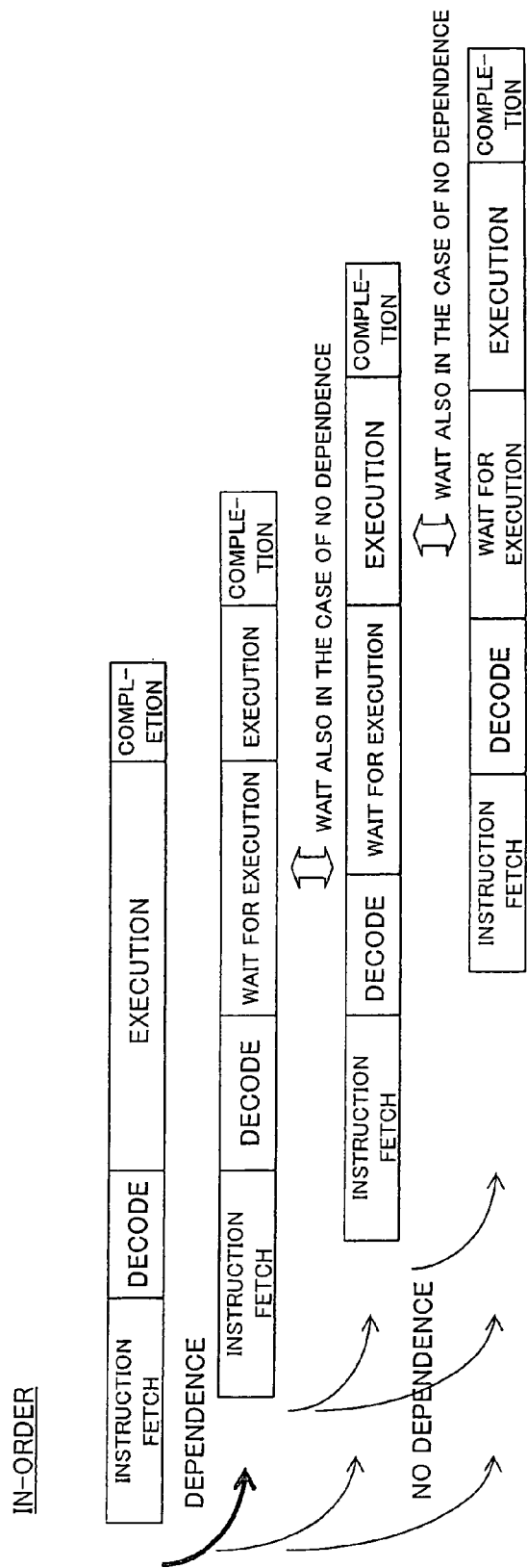
FIG. 23 is an illustration for explaining an in-order execution type processing method.
Figure 24:
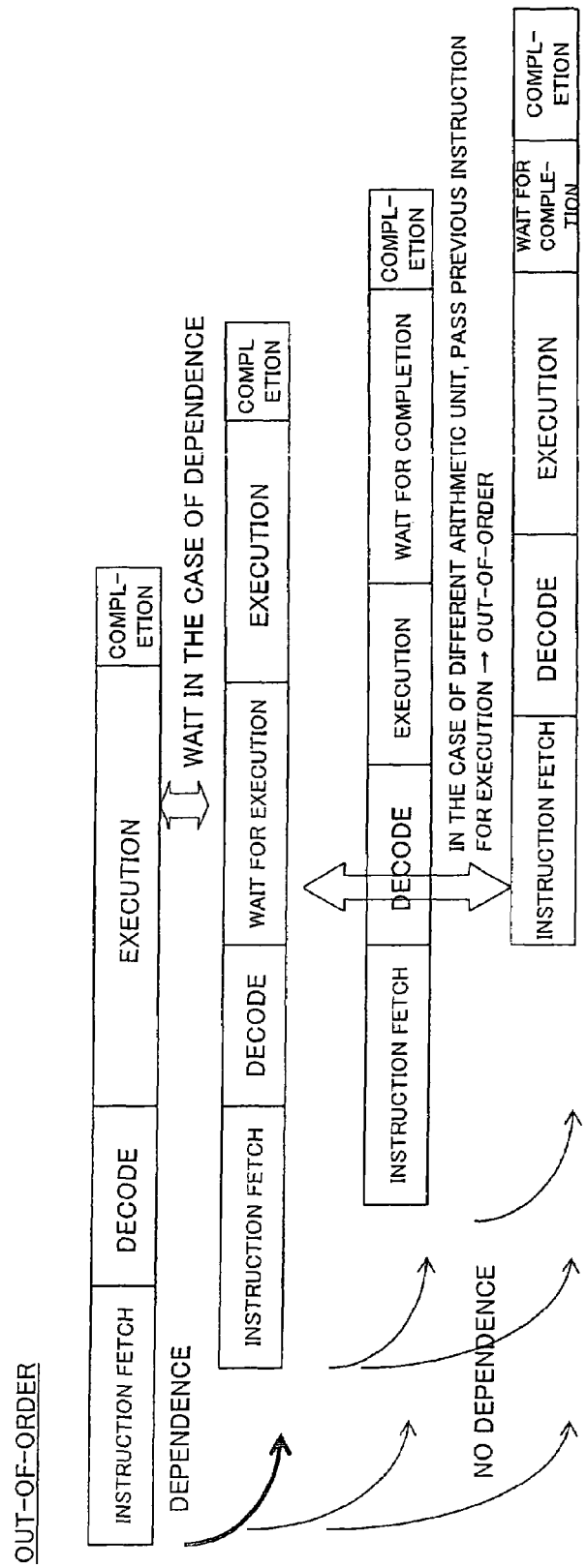
FIG. 24 is an illustration for explaining an out-of-order execution type processing method.
Figure 25A:
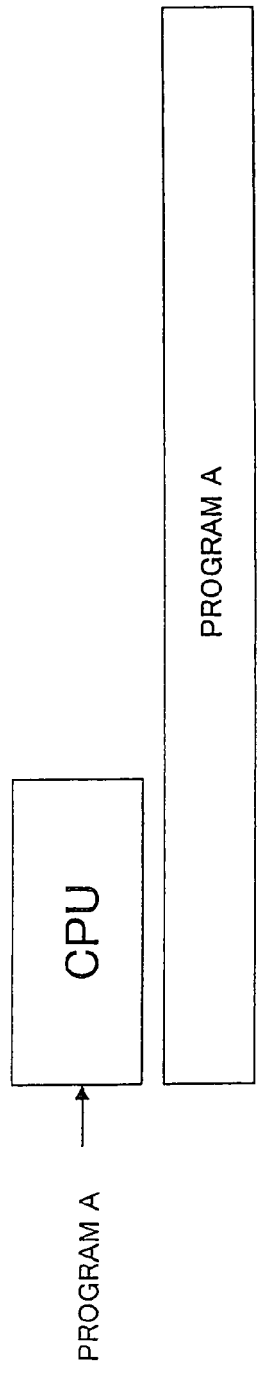
FIGS. 25A and 25B are illustrations for explaining a multithread processor system.
Figure 25B:
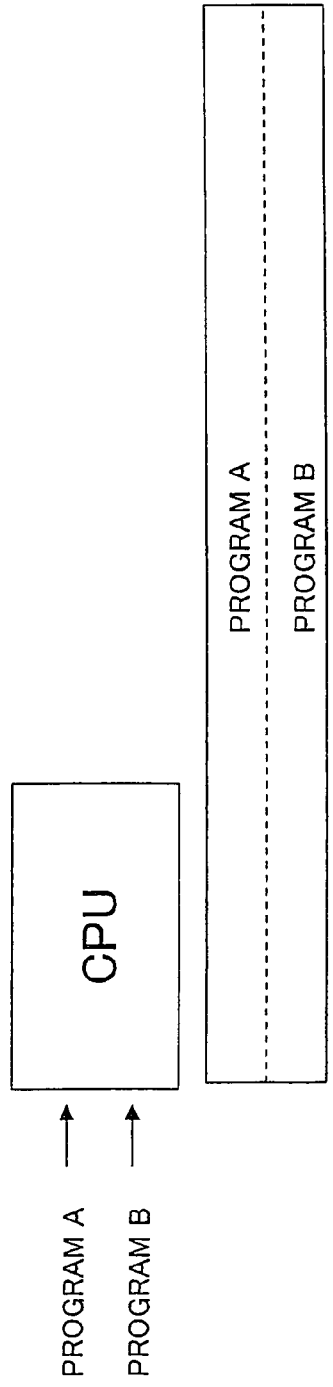
Figure 27:
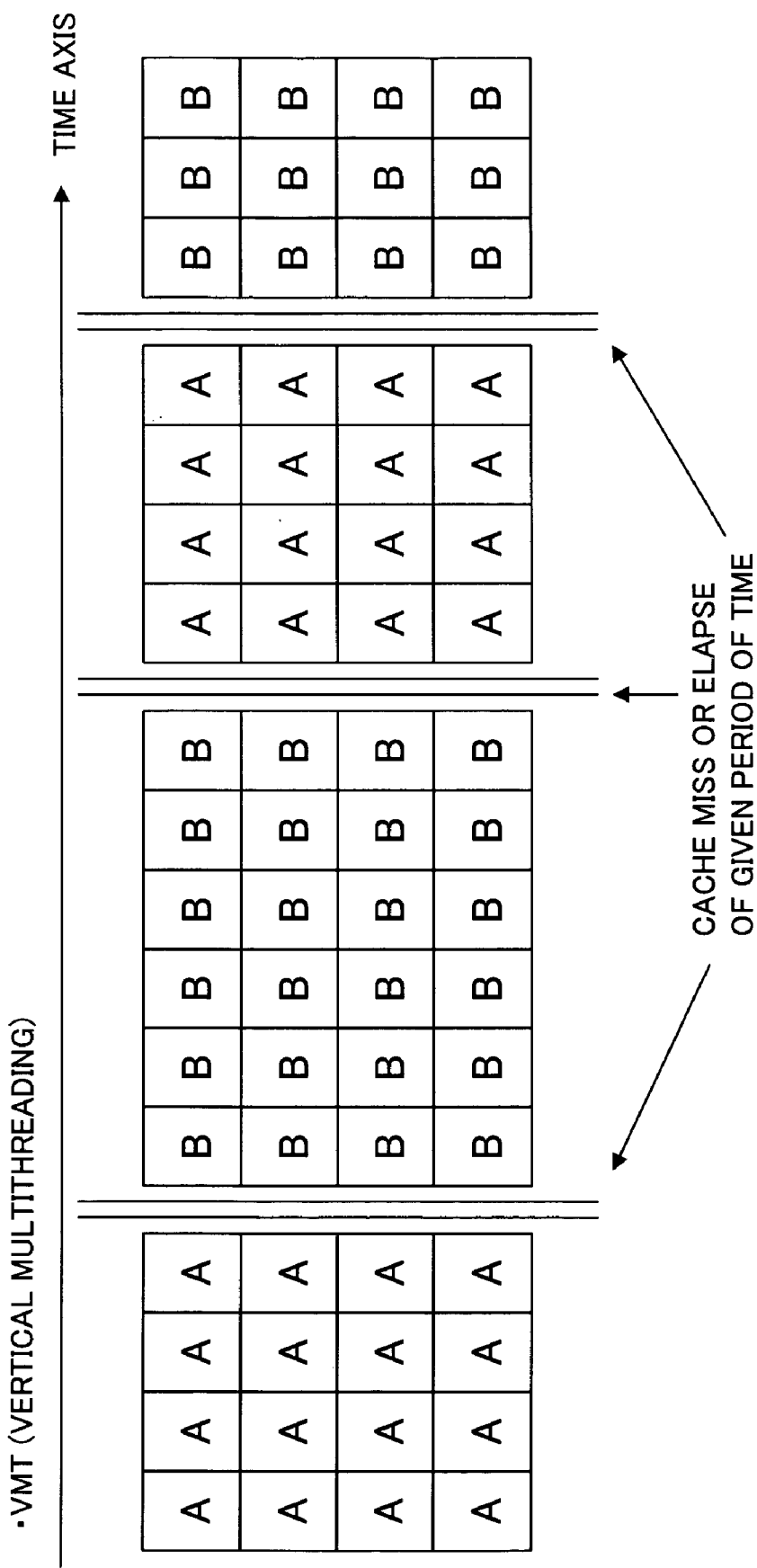
FIG. 27 is an illustration for explaining a VMT method.
Figure 28:
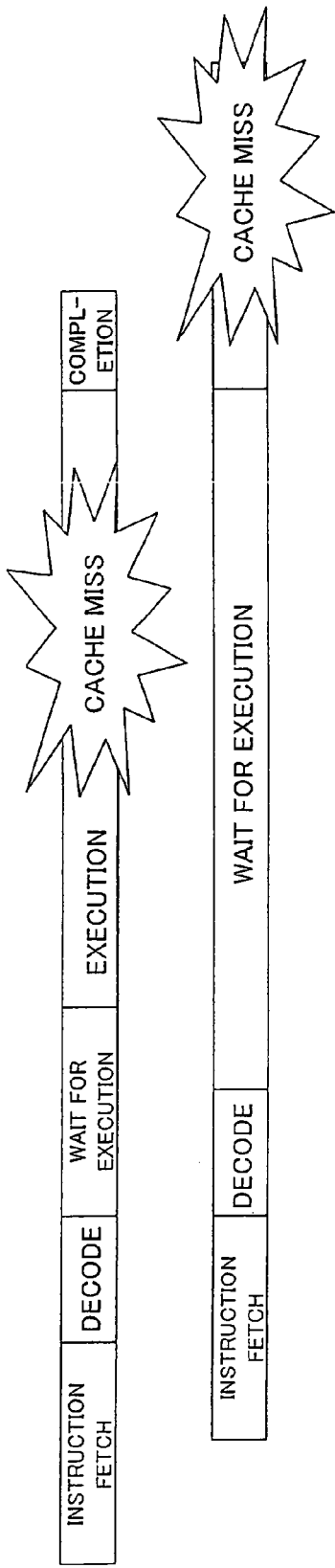
FIG. 28 is an illustration for explaining the processing at cache miss according to the in-order mode.
Figure 29:
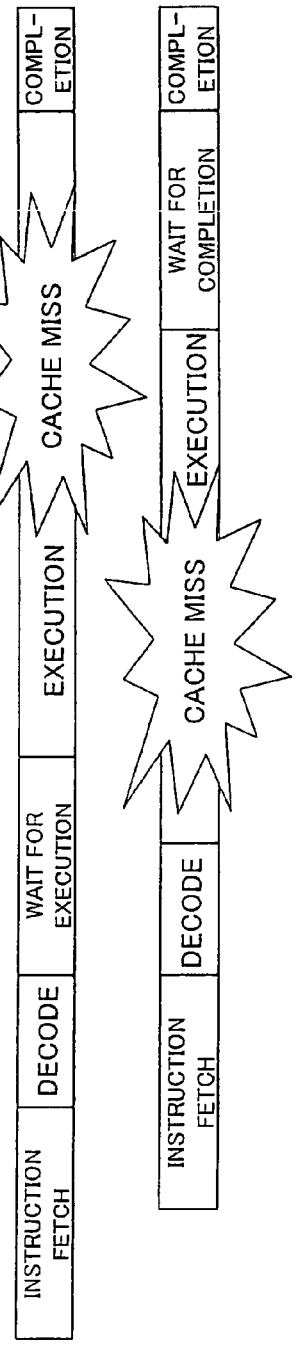
FIG. 29 is an illustration for explaining the processing at cache miss according to the out-of-order mode.
Figure 30:
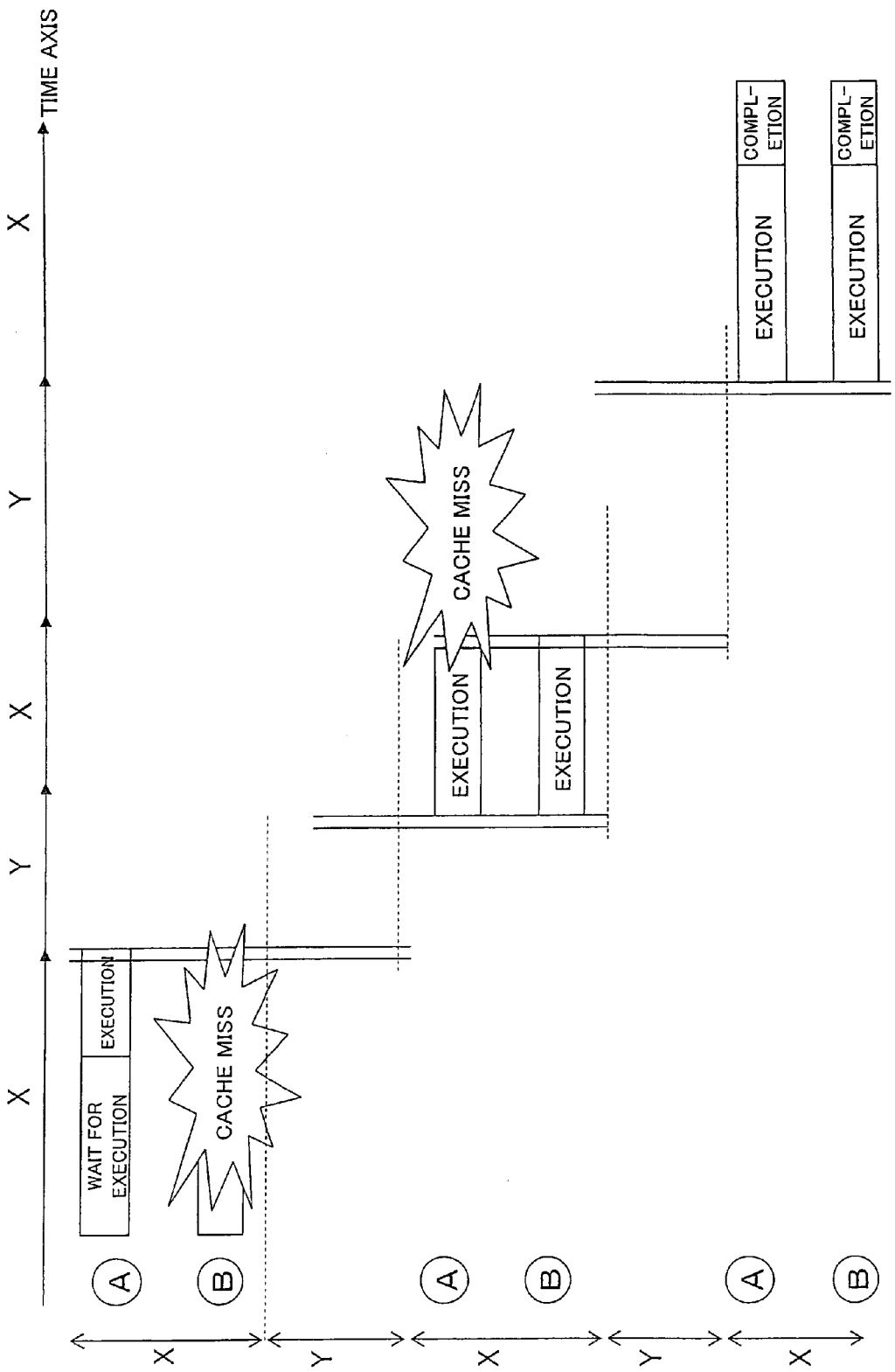
FIG. 30 is an illustration for explaining a conventional thread switching method according to the out-of-order method.

FIG. 21 is an illustration of a thread switching timing in this CPU 1, and FIG. 22 is an illustration of the processing at the resumption of a thread in this CPU 1.

As FIG. 21 shows, with the CPU 1 according to the embodiment of the present invention, in the VMT mode, in a case in which the instructions A and B are instructions in the thread X, the thread X is not switched even if a cache miss occurs on the instruction B, and the switching is made in wait for the start of the memory access to the main memory 21 after a cache miss occurs on the preceding instruction A, which provides an cover-up effect with respect to the processing in which the data on the instructions A and B are fetched from the memory when the thread X is resumed thereafter.

In this connection, as shown in FIG. 22, after the return of the thread, if data already exists in the L1 data cache 19, the instruction is processed as an L1 cache hit.

Moreover, a case in which the L1 data cache 19 cannot secure the L1MIB 26 and the switching is made in a state of the oldest request in the program sequence in the fetch queue 28 signifies the report on the fact that the instruction securing the L1MIB 26 on the same cache line reaches completion. This enables securing the L1MIB 26 after the return of the thread and issuing a request to the L2 cache 20.

When the thread is already returned, in the report on the data response, the switching trigger flag is reset and the signal indicative of the data return is disregarded.

Meanwhile, in the VMT mode, there is a case in which the processing time varies in accordance with the combination of the threads to be executed in parallel. For example, when two threads are run, as the combination patterns, there are considered a case in which both the threads are the same type (that is, threads in which a cache miss occurs, or threads in which no cache miss occurs) and a case in which a thread in which a cache miss occurs and a thread in which no cache miss occurs, which are different in characteristic from each other.

In the case of the threads in which a cache miss occurs or the threads in which no cache miss occurs, since both the threads are switched in like manner, the difference between the thread processing is hard to develop. On the other hand, for example, in the case of the combination of one thread bringing about a cache miss and the other bringing about no cache miss, the thread bringing about the cache miss falls immediately into a halt state while the thread bringing about no cache miss runs fully for a given period of time.

In addition, also in a case in which there is a response on data suffering a cache miss and the processing after the cache miss is resumable, since there is a need to wait for the processing until the switching from the thread bringing about no cache miss, the processing time for the thread bringing about a cache miss is considerably prolonged.

In the multithread processor (CPU 1) according to the embodiment of the present invention, when the processing on a cache request which is a factor of the thread switching is resumable by a response from the main memory 21, the thread is returned, thus suppressing the considerable prolongation of the processing time for a program bringing about a cache miss even in the case of a combination of a program bringing about no cache miss and the program bringing about the cache miss.

Although this CPU 1 deals with, in addition to a demand request, a prefetch request, for reporting the cache miss which is an factor of the thread switching, it is also possible to selectively report the cache miss according to factor without always reporting all the cache miss, which achieves the thread switching effectively.

In addition, in the multithread processor in which the cache miss is not always processed in the program instruction sequence and which is made to conduct the prefetch processing and to carry out the store instruction detachment processing, the covering-up of the fact of the interference with the instruction execution and completion stemming from the processing on the data response to the main memory 21 can effectively be made through the thread switching.

It should be understood that the present invention is not limited to the above-described embodiment, and that it is intended to cover all changes and modifications of the embodiment of the invention herein which do not constitute departures from the spirit and scope of the invention.

For example, although in the above description of the embodiment the CPU 1 is equipped with the two-hierarchical cache structure (cache) comprising the primary cache (L1 instruction cache 18, L1 data cache 19) and the secondary cache (L2 cache 20), the present invention is not limited to this. It is also possible to employ the tertiary (three-hierarchical) or more cache structure.

In addition, in the above-described embodiment, the main memory 21 and the CPU 1 are connected to each other through the bus 22 which is lower in data transfer rate than an internal bus (not shown) in the CPU 1 and the L2 cache 20 located inside (CPU 1 side) the bus 22 and connected through the bus 22 to the main memory 21 is set as a cache existing at the lowest place in the hierarchy. Therefore, for example, in a case in which another storage unit (memory) is connected thereto through a communication means having a data transfer rate, which stands comparison with the internal bus of the CPU 1, this storage unit can also be provided as a cache arranged hierarchically.

Still additionally, a storage unit connected through a communication means (bus or the like) considerably inferior in data transfer rate to the internal bus of the CPU 1 is handled as an external storage unit.

The disclosure of each embodiment of the present invention enables the present invention to be effected/produced by a person skilled in the art.

What is claimed is:

1. A multithread processor designed to carry out a plurality of threads, each having at least one instruction, in parallel through the use of one or more arithmetic units, comprising:

a multithread control unit selectively switching a first thread among said plurality of threads to be executed by said arithmetic unit and for setting a thread identifier indicative of the first thread to which said instruction pertains;

an instruction control unit setting an instruction identifier which specifies an instruction in the first thread;

a plurality of caches arranged hierarchically and each made to retain data temporarily; and a cache control unit for managing writing/readout of said data in/from said plurality of caches, in a case in which a cache miss among the plurality of caches, in which the instruction to be executed by said arithmetic units does not exist in a first cache of said plurality of caches, occurs on a request related to said instruction in the first cache which is at the lowest place in the hierarchy, with respect to said request related to said cache miss, said cache control unit notifying said instruction identifier and said thread identifier, related to said instruction, to said multithread control unit, when a request related to said cache miss is issued from a second cache of said plurality of caches, which is at a higher place in the hierarchy than the first cache and in which said cache miss occurs, to the first cache, said cache control unit secures a storage area for storing data response from the first cache with respect to said request and sets a cache request identifier for specifying said storage area and, in a case in which said instruction is in the first thread and is a demand request which leads to the interchange of said data between a register for storing said data so that said arithmetic unit carries out arithmetic operations and an external storage unit in the exterior of said multithread processor, notifies said thread identifier, said cache request identifier and said instruction identifier, related to the instruction, to said multithread control unit, said multithread control unit making the switching of the first thread, which is in execution in said arithmetic unit, to a second thread based on said instruction identifier and said thread identifier notified from said cache control unit, and said cache control unit monitors an elapsed time after a prefetch request is issued to said external storage unit and, in a case in which said data to be accessed according to said instruction agrees with said data acquired from said external storage unit according to a preceding prefetch request and the elapsed time exceeds a predetermined period of time, said cache control unit does not notify said thread identifier, said cache request identifier and said instruction identifier, related to said instruction, to said multithread control unit.

2. The multithread processor according to claim 1, further comprising a fetch sequence managing unit for managing a scheduled instruction completion sequence of said instruction about a fetch so that, in a case in which, a cache line allocated on the second cache, with respect to a leading demand request of said scheduled instruction completion sequence in said fetch sequence managing unit is identical to a cache line succeeding said leading demand request in the order on said first thread and allocated on second cache with respect to said instruction for which said storage area is secured and on which said cache miss occurs prior to said demand request, said cache control unit notifies said thread identifier and said instruction identifier, related to said demand request, together with said cache request identifier related to said instruction to said multithread control unit.

3. The multithread processor according to claim 2, further comprising a cache miss information storing unit in which at least information indicative of the occurrence of a cache miss, said cache request identifier related to said cache miss, and said thread identifier and said instruction identifier, related to the request, are registered in a state associated to each other, so that said multithread control unit acquires said information on said cache miss on the basis of said information stored in said cache miss information storing unit.

4. The multithread processor according to claim 2, further comprising a cache miss information storing unit in which at least information indicative of the occurrence of a cache miss, said cache request identifier related to said cache miss, and said thread identifier and said instruction identifier, related to the request, are registered in a state associated to each other so that said multithread control unit acquires said information on said cache miss on the basis of said information stored in said cache miss information storing unit.

5. The muitithread processor according to claim 4, wherein information for specifying a move-in buffer made to temporally store response data to a request issued to the first cache or said external storage unit in conjunction with the occurrence of said cache miss is used as said cache request identifier.

6. The muitithread processor according to claim 5, wherein, after at east said information indicative of the occurrence of said cache miss, said cache request identifier, and said thread identifier and said instruction identifier, related to said instruction, are stored in said cache miss information storing unit, when data response to said instruction is made from said external storage unit, said cache control unit notifies information indicative of said data response and said cache request identifier related to said data response to said multithread control unit and resets the corresponding information indicative of the occurrence of said cache miss in said cache miss information storing unit.

7. The multithread processor according to claim 6, wherein said cache miss information storing unit is made such that at least said information indicative of the occurrence of said cache miss, and said thread identifier and said instruction identifier, related to said request, are registered in a state associated with each other and is made as a cache miss information buffer provided for each move-in buffer.

8. The muitithread processor according to claim 5, wherein said cache miss information storing unit is made such that at least said information indicative of the occurrence of said cache miss, and said thread identifier and said instruction identifier, related to said request, are registered in a state associated with each other and is made as a cache miss information buffer provided for each move-in buffer.

9. The multithread processor according to claim 4, wherein, after at least said information indicative of the occurrence of said cache miss, said cache request identifier, and said thread identifier and said instruction identifier, related to said instruction, are stored in said cache miss information storing unit, when data response to said instruction is made from said external storage unit, said cache control unit notifies information indicative of said data response and said cache request identifier related to said data response to said muitithread control unit and resets the corresponding information indicative of the occurrence of said cache miss in said cache miss information storing unit.

10. The multithread processor according to claim 4, wherein said information indicative of the occurrence of said cache miss is registered in said cache miss information storing unit and, in a case in which said instruction identifier and said thread identifier, related to said cache request, agree with an instruction identifier and a thread identifier related to a leading instruction in said scheduled instruction completion sequence managed in said fetch sequence managing unit, said multithread control unit switches said thread.

11. The multithread processor according to claim 4, wherein, in a case in which said cache miss occurs when said instruction which is in execution but which does not reach completion is canceled, said multithread control unit resets said information indicative of the occurrence of said cache miss with respect to the corresponding cache request in said cache miss information storing unit.

12. The multithread processor according to claim 4, wherein said cache miss information storing unit stores information indicative of a factor contributing to the fact that the first thread transits to a halt state with respect to said request which suffers said cache miss which leads to the switching of said thread.

13. The multithread processor according to claim 12, wherein said information indicative of said factor contributing to the fact that the first thread transits to said halt state in said cache miss information storing unit is reset when the first thread is switched and returned.

14. The multithread processor according to claim 13, wherein, when a data response related to said cache miss takes place, said cache control unit notifies a signal indicative of said data response and a cache request identifier corresponding thereto to said multithread control unit so that said multithread control unit switches and returns the first thread when said information indicative of said factor contributing to the fact that the first thread transits to said halt state is stored in said cache miss information storing unit.

15. The multithread processor according to claim 12, wherein, when a data response related to said cache miss takes place, said cache control unit notifies a signal indicative of said data response and the cache request identifier to said multithread control unit so that said multithread control unit switches and returns the first thread when said information indicative of said factor contributing to the fact that the first thread transits to said halt state is stored in said cache miss information storing unit.

16. The multithread processor according to claim 4, wherein said cache miss information storing unit stores said information indicative of said factor contributing to the fact that the first thread transits to said halt state with respect to said request suffering said cache miss which leads to the first thread switching and, when data response related to said cache miss takes place, said cache control unit notifies a signal indicative of said data response and the cache request identifier to said multithread control unit, and when said information indicative of said factor contributing to the transition of the first thread to said halt state is stored in said cache miss information storing unit, said multithread control unit switches and returns the first thread.

17. The multithread processor according to claim 1, further comprising a fetch sequence managing unit for managing a scheduled instruction completion sequence of said instruction about a fetch so that, in a case in which, as said scheduled instruction completion sequence in said fetch sequence managing unit, a cache line allocated on second cache with respect to a leading demand request is identical to a cache line succeeding said demand request in the order on the first thread and allocated on the second cache with respect to said instruction for which said storage area is secured and on which said cache miss occurs prior to said demand request, said cache control unit notifies said thread identifier and said instruction identifier, related to said demand request, together with said cache request identifier related to said instruction to said multithread control unit.

18. The multithread processor according to claim 17, further comprising a cache miss information storing unit in which at least information indicative of the occurrence of a cache miss, said cache request identifier related to said cache miss, and said thread identifier and said instruction identifier, related to the request, are registered in a state associated to each other so that said multithread control unit acquires said information on said cache miss on the basis of said information stored in said cache miss information storing unit.

19. The multithread processor according to claim 1, further comprising a cache miss information storing unit in which at least information indicative of the occurrence of a cache miss, said cache request identifier related to said cache miss, and said thread identifier and said instruction identifier, related to the request, are registered in a state associated to each other, so that said multithread control unit acquires said information on said cache miss on the basis of said information stored in said cache miss information storing unit.

20. The multithread processor according to claim 1, further comprising a cache miss information storing unit in which at least information indicative of the occurrence of a cache miss, said cache request identifier related to said cache miss, and said thread identifier and said instruction identifier, related to the request, are registered in a state associated to each other, so that said multithread control unit acquires said information on said cache miss on the basis of said information stored in said cache miss information storing unit.

21. The multithread processor according to claim 1, further comprising a cache miss information storing unit in which at least information indicative of the occurrence of a cache miss, said cache request identifier related to said cache miss, and said thread identifier and said instruction identifier, related to the request, are registered in a state associated to each other, so that said multithread control unit acquires said information on said cache miss on the basis of said information stored in said cache miss information storing unit.

22. The multithread processor according to claim 1, wherein, in a case in which said instruction is a store instruction and a cache miss occurs on an address of an object of the store, said instruction control unit carries out detachment control to handle said store instruction as said store instruction reaches completion, without waiting for data response related to the store object address, and said cache control unit does not make notification on said cache miss of said store instruction to said multithread control unit.

23. The multithread processor according to claim 1, wherein, in a case in which said cache miss occurs on said instruction in canceling said instruction which is in execution and which does not reach completion, said cache control unit does not notify the fact of the occurrence of said cache miss, said cache request identifier, said thread identifier and said instruction identifier to said multithread control unit.

24. The multithread processor according to claim 1, wherein said cache control unit is provided for each of said plurality of caches.

25. A multithread processor designed to carry out a plurality of threads, each having at least one instruction, in parallel through the use of one or more arithmetic units, comprising:
a multithread control unit selectively switching a first thread among said plurality of threads to be executed by said arithmetic unit and for setting a thread identifier indicative of the first thread to which said instruction pertains;
an instruction control unit setting an instruction identifier which specifies said instruction in the first thread;
a plurality of caches arranged hierarchically and each made to retain data temporarily; and
a cache control unit for managing writing/readout of said data in/from said plurality of caches,
in a case in which a cache miss among a plurality of caches, in which the instruction to be executed by said arithmetic units does not exist in a first cache of said plurality of caches, occurs on a request related to said instruction in the first cache which is at the lowest place in the hierarchy, with respect to said request related to said cache miss, said cache control unit notifying said instruction identifier and said thread identifier, related to said instruction, to said multithread control unit,
when a request related to said cache miss is issued from a second cache of said plurality of caches, which is at a higher place in the hierarchy and in which said cache miss occurs, to the first cache, said cache control unit secures a storage area for storing data response from the first cache with respect to said request and sets a cache request identifier for specifying said storage area and, in a case in which said instruction is in the first thread and is a demand request which leads to the interchange of said data between a register for storing said data so that said arithmetic unit carries out arithmetic operations and an external storage unit in the exterior of said multithread processor, notifies said thread identifier, said cache request identifier and said instruction identifier, related to said instruction, to said multithread control unit,
said multithread control unit making the switching of the first thread, which is in execution in said arithmetic unit, to a second thread based on said instruction identifier and said thread identifier notified from said cache control unit,
in case in which said instruction is a prefetch request for putting said data, acquired from said external storage unit in advance, in said register, said cache control unit does not notify said thread identifier, said cache request identifier and said instruction identifier, related to said instruction, to said multithread control unit, and
said cache control unit monitors an elapsed time after said prefetch request is issued to said external storage unit and, in a case in which said data to be accessed according to said instruction agrees with said data acquired from said external storage unit according to a preceding prefetch request and the elapsed time exceeds a predetermined period of time, said cache control unit does not notify said thread identifier, said cache request identifier and said instruction identifier, related to said instruction, to said multithread control unit.

26. The multithread processor according to claim 25, further comprising a fetch sequence managing unit for managing a scheduled instruction completion sequence of said instruction about a fetch so that, in a case in which, as said scheduled instruction completion sequence in said fetch sequence managing unit, a cache line allocated on the second cache with respect to a leading demand request is identical to a cache line succeeding said demand request in the order on the first thread and allocated on the second cache with respect to said instruction for which said storage area is secured and on which said cache miss occurs prior to said demand request, said cache control unit notifies said thread identifier and said instruction identifier, related to said demand request, together with said cache request identifier related to said instruction to said multithread control unit.

27. The multithread processor according to claim 26, further comprising a cache miss information storing unit in which at least information indicative of the occurrence of a cache miss, said cache request identifier related to said cache miss, and said thread identifier and said instruction identifier, related to the request, are registered in a state associated to each other so that said multithread control unit acquires said information on said cache miss on the basis of said information stored in said cache miss information storing unit.

28. The multithread processor according to claim 25, further comprising a fetch sequence managing unit for managing a scheduled instruction completion sequence of said instruction about a fetch so that, in a case in which, as said scheduled instruction completion sequence in said fetch sequence managing unit, a cache line allocated on the second cache with respect to a leading demand request is identical to a cache line succeeding said demand request in the order on the first thread and allocated on the second cache with respect to said instruction for which said storage area is secured and on which said cache miss occurs prior to said demand request, said cache control unit notifies said thread identifier and said instruction identifier, related to said demand request, together with said cache request identifier related to said instruction to said multithread control unit.

29. The multithread processor according to claim 28, further comprising a cache miss information storing unit in which at least information indicative of the occurrence of a cache miss, said cache request identifier related to said cache miss, and said thread identifier and said instruction identifier, related to the request, are registered in a state associated to each other, so that said multithread control unit acquires said information on said cache miss on the basis of said information stored in said cache miss information storing unit.

30. The multithread processor according to claim 28, further comprising a cache miss information storing unit in which at least information indicative of the occurrence of a cache miss, said cache request identifier related to said cache miss, and said thread identifier and said instruction identifier, related to the request, are registered in a state associated to each other so that said muitithread control unit acquires said information on said cache miss on the basis of said information stored in said cache miss information storing unit.

31. A thread switching control method for use in a multithread processor made to carry out a plurality of threads in parallel through the use of one or more arithmetic units, comprising:

setting a thread identifier indicative of a first thread of said plurality of threads to which an instruction pertains;

setting an instruction identifier for specifying said instruction of said thread;

a cache control step of managing the writing/readout of data in/from said plurality of caches arranged hierarchically and made to retain the data temporarily, a switching step of, in a case in which a cache miss occurs on a request related to said instruction in a first cache which is at the lowest place in the hierarchy, making the switching from the first thread, which is in execution in said arithmetic unit, to a second thread based on said instruction identifier and said thread identifier, related to said request, with respect to said request related to said cache miss, securing a storage area for storing a data response from the first cache with respect to said request, when a request related to said cache miss is issued from a second cache of said plurality of caches, which is at a higher place in the hierarchy and in which said cache miss occurs, to the first cache, setting a cache request identifier for specifying said storage area and, in a case in which said instruction is an instruction in the first thread and is a demand request which leads to the interchange of said data between a register for storing said data so that said arithmetic unit carries out arithmetic operations and an external storage unit in the exterior of said multithread processor, monitoring an elapsed time after a prefetch request is issued to said external storage unit; and if said data to be accessed according to said instruction agrees with said data acquired from said external storage unit according to a preceding prefetch request and the elapsed time exceeds a predetermined period of time, deterring the switching, by prohibiting notification of said thread identifier, said cache request identifier and said instruction identifier, related to said instruction.

* * * * *

UNITED STATES PATENT AND TRADEMARK OFFICE
CERTIFICATE OF CORRECTION

PATENT NO. : 7,310,705 B2  Page 1 of 1
APPLICATION NO. : 10/981772
DATED : December 18, 2007
INVENTOR(S) : Toshio Yoshida et al.

It is certified that error appears in the above-identified patent and that said Letters Patent is hereby corrected as shown below:

First page, Col. 1, (56) References Cited
line 1, after "Kimura" insert --et al.--.

Col. 18, line 57, delete "cache," and insert --cache--, therefor.

Col. 19, line 19, delete "muitithread" and insert --multithread--, therefor.

line 21, delete "temporally" and insert --temporarily--, therefor.

line 25, delete "muitithread" and insert --multithread--, therefor.

line 26, delete "east" and insert --least--, therefor.

line 44, delete "muitithread" and insert --multithread--, therefor.

line 60, delete "muitithread" and insert --multithread--, therefor.

Col. 23, line 42, delete "muitithread" and insert --multithread--, therefor.

Signed and Sealed this

Tenth Day of June, 2008

JON W. DUDAS
*Director of the United States Patent and Trademark Office*